US010063438B2

(12) United States Patent
Ogrinz et al.

(10) Patent No.: US 10,063,438 B2
(45) Date of Patent: *Aug. 28, 2018

(54) SECURITY IMPLEMENTATION FOR RESOURCE DISTRIBUTION

(71) Applicant: Bank of America Corporation, Charlotte, NC (US)

(72) Inventors: Michael Emil Ogrinz, Easton, CT (US); Evan Sachs, New York, NY (US); Stephen A. Corrado, Marvin, NC (US); Joseph Benjamin Castinado, North Glenn, CO (US); Matthew Hsieh, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/591,323

(22) Filed: May 10, 2017

(65) Prior Publication Data
US 2017/0279695 A1 Sep. 28, 2017

Related U.S. Application Data

(63) Continuation of application No. 15/082,591, filed on Mar. 28, 2016, now Pat. No. 9,743,272.

(51) Int. Cl.
*H04M 3/00* (2006.01)
*H04L 12/26* (2006.01)
(Continued)

(52) U.S. Cl.
CPC ...... *H04L 43/0817* (2013.01); *H04L 41/0654* (2013.01); *H04L 67/12* (2013.01); *H04L 67/303* (2013.01)

(58) Field of Classification Search
CPC .............. H04L 43/0817; H04L 41/0654; H04L 67/303
(Continued)

(56) References Cited

U.S. PATENT DOCUMENTS 5,717,923 A 2/1998 Dedrick et al.
5,761,648 A 6/1998 Golden et al.
(Continued)

FOREIGN PATENT DOCUMENTS

CN 104283967 A 1/2015

OTHER PUBLICATIONS

Friedman, Jack P., Dictionary of Business Terms, 2000, Barron's Educational Series, Inc., 3rd edition, 225.
(Continued)

*Primary Examiner* — Nghi H Ly
(74) *Attorney, Agent, or Firm* — Michael A. Springs; Moore & Van Allen PLLC; Peter B. Stewart

(57) ABSTRACT

A system for securely distributing and managing resources includes a smart device, a resource management device, and a third party system, each having communication interfaces, and memory device, and processing device. In the resource management device, the processing device is configured to: receive from a smart device a set of smart device data via the smart device communication interface; detect within the set of smart device data a subset of data associated with a failure condition of the smart device; and communicate a set of instruction information to a third party system, wherein the instruction information is usable by the third party system to initiate a targeted communication between a host entity system associated with the smart device and the custodian such that maintenance, repair, and/or replacement of the smart device can be effectuated.

20 Claims, 8 Drawing Sheets

(51) Int. Cl.
*H04L 29/08* (2006.01)
*H04L 12/24* (2006.01)

(58) Field of Classification Search
USPC .............................. 455/418, 414.1, 419, 423
See application file for complete search history.

(56) References Cited

U.S. PATENT DOCUMENTS

| | | |
|---|---|---|
| 5,842,185 A | 11/1998 | Chancey et al. |
| 5,848,396 A | 12/1998 | Gerace et al. |
| 5,870,770 A | 2/1999 | Wolfe et al. |
| 5,907,830 A | 5/1999 | Engel et al. |
| 5,911,135 A | 6/1999 | Atkins et al. |
| 5,933,811 A | 8/1999 | Angles et al. |
| 6,006,252 A | 12/1999 | Wolfe et al. |
| 6,009,411 A | 12/1999 | Kepecs et al. |
| 6,009,413 A | 12/1999 | Webber et al. |
| 6,041,309 A | 3/2000 | Laor et al. |
| 6,055,573 A | 4/2000 | Gardenswartz et al. |
| 6,076,069 A | 6/2000 | Laor et al. |
| 6,223,163 B1 | 4/2001 | Van Luchene |
| 6,263,351 B1 | 7/2001 | Wolfe |
| 6,282,567 B1 | 8/2001 | Finch, II et al. |
| 6,292,786 B1 | 9/2001 | Deaton et al. |
| 6,292,813 B1 | 9/2001 | Wolfe |
| 6,317,718 B1 | 11/2001 | Fano |
| 6,321,208 B1 | 11/2001 | Barnett et al. |
| 6,330,543 B1 | 12/2001 | Kepecs |
| 6,332,126 B1 | 12/2001 | Peirce et al. |
| 6,336,099 B1 | 1/2002 | Barnett et al. |
| 6,336,131 B1 | 1/2002 | Wolfe |
| 6,341,305 B2 | 1/2002 | Wolfe |
| 6,349,290 B1 | 2/2002 | Horowitz et al. |
| 6,385,592 B1 | 5/2002 | Angles et al. |
| 6,434,534 B1 | 8/2002 | Walker et al. |
| 6,505,168 B1 | 1/2003 | Rothman et al. |
| 6,611,814 B1 | 8/2003 | Lee et al. |
| 6,615,184 B1 | 9/2003 | Hicks |
| 6,622,174 B1 | 9/2003 | Ukita et al. |
| 6,678,685 B2 | 1/2004 | McGill et al. |
| 6,782,370 B1 | 8/2004 | Stack |
| 6,853,291 B1 | 2/2005 | Aisa |
| 6,865,545 B1 | 3/2005 | Epstein et al. |
| 6,906,617 B1 | 6/2005 | Van der Meulen |
| 6,925,444 B1 | 8/2005 | McCollom et al. |
| 6,937,995 B1 | 8/2005 | Kepecs |
| 7,024,374 B1 | 4/2006 | Day et al. |
| 7,043,526 B1 | 5/2006 | Wolfe |
| 7,096,193 B1 | 8/2006 | Beaudoin et al. |
| 7,099,832 B2 | 8/2006 | Walker et al. |
| 7,124,096 B2 | 10/2006 | Dutta et al. |
| 7,127,414 B1 | 10/2006 | Awadallah et al. |
| 7,162,443 B2 | 1/2007 | Shah |
| 7,181,488 B2 | 2/2007 | Martin et al. |
| 7,225,167 B2 | 5/2007 | Hind et al. |
| 7,231,357 B1 | 6/2007 | Shanman et al. |
| 7,236,942 B1 | 6/2007 | Walker et al. |
| 7,246,310 B1 | 7/2007 | Wolfe |
| 7,249,058 B2 | 7/2007 | Kim et al. |
| 7,254,548 B1 | 8/2007 | Tannenbaum |
| 7,257,604 B1 | 8/2007 | Wolfe |
| 7,299,007 B2 | 11/2007 | Eskin |
| 7,302,429 B1 | 11/2007 | Wanker |
| 7,302,638 B1 | 11/2007 | Wolfe |
| 7,315,834 B2 | 1/2008 | Martineau et al. |
| 7,324,965 B2 | 1/2008 | Martineau et al. |
| 7,340,419 B2 | 3/2008 | Walker et al. |
| 7,356,490 B1 | 4/2008 | Jacobi et al. |
| 7,386,477 B2 | 6/2008 | Fano |
| 7,398,248 B2 | 7/2008 | Phillips et al. |
| 7,412,604 B1 | 8/2008 | Doyle |
| 7,433,874 B1 | 10/2008 | Wolfe |
| 7,464,050 B1 | 12/2008 | Deaton et al. |
| 7,472,088 B2 | 12/2008 | Taylor et al. |
| 7,490,056 B2 | 2/2009 | Nash |
| 7,512,551 B2 | 3/2009 | Postrel |
| 7,536,385 B1 | 5/2009 | Wolfe |
| 7,552,080 B1 | 6/2009 | Willard et al. |
| 7,578,435 B2 | 8/2009 | Suk |
| 7,593,862 B2 | 9/2009 | Mankoff |
| 7,599,850 B1 | 10/2009 | Laor |
| 7,606,736 B2 | 10/2009 | Martineau et al. |
| 7,860,792 B1 | 12/2010 | Magruder et al. |
| 7,925,579 B1 | 4/2011 | Flaxman et al. |
| 8,042,178 B1 | 10/2011 | Fisher et al. |
| 8,234,194 B2 | 7/2012 | Mele et al. |
| 8,301,558 B2 | 10/2012 | Marshall et al. |
| 8,442,894 B2 | 5/2013 | Blackhurst et al. |
| 8,495,072 B1 | 7/2013 | Kapoor et al. |
| 8,930,265 B2 | 1/2015 | Blackhurst et al. |
| 8,964,113 B2 | 2/2015 | Kannermark et al. |
| 9,009,828 B1 | 4/2015 | Ramsey et al. |
| 9,032,077 B1 | 5/2015 | Klein et al. |
| 9,043,879 B1 | 5/2015 | Reeves et al. |
| 9,104,189 B2 | 8/2015 | Berges Gonzalez et al. |
| 9,106,615 B2 | 8/2015 | Grossman |
| 9,338,181 B1 | 5/2016 | Burns et al. |
| 9,411,982 B1 | 8/2016 | Dippenaar et al. |
| 9,743,272 B1 * | 8/2017 | Ogrinz .................... H04W 8/22 |
| 9,775,131 B2 | 9/2017 | Winand et al. |
| 9,843,624 B1 | 12/2017 | Taaghol et al. |
| 9,874,923 B1 | 1/2018 | Brown et al. |
| 9,946,571 B1 | 4/2018 | Brown et al. |
| 2002/0032626 A1 | 3/2002 | DeWolf et al. |
| 2002/0049624 A1 | 4/2002 | Raveis, Jr. |
| 2002/0052803 A1 | 5/2002 | Amidhozour et al. |
| 2002/0062249 A1 | 5/2002 | Iannacci |
| 2002/0072975 A1 | 6/2002 | Steele et al. |
| 2002/0091571 A1 | 7/2002 | Thomas et al. |
| 2002/0114433 A1 | 8/2002 | Katou et al. |
| 2002/0143564 A1 | 10/2002 | Webb et al. |
| 2002/0190118 A1 | 12/2002 | Davenport et al. |
| 2004/0122736 A1 | 6/2004 | Strock et al. |
| 2004/0192339 A1 | 9/2004 | Wilson et al. |
| 2004/0226995 A1 | 11/2004 | Smith |
| 2004/0230593 A1 | 11/2004 | Rudin et al. |
| 2004/0249768 A1 | 12/2004 | Kontio et al. |
| 2005/0015624 A1 | 1/2005 | Ginter et al. |
| 2005/0039053 A1 | 2/2005 | Walia |
| 2005/0075975 A1 | 4/2005 | Rosner et al. |
| 2005/0171845 A1 | 8/2005 | Halfman et al. |
| 2005/0173517 A1 | 8/2005 | Suk et al. |
| 2005/0177437 A1 | 8/2005 | Ferrier |
| 2005/0221842 A1 | 10/2005 | Kaneko et al. |
| 2005/0286079 A1 | 12/2005 | Takagi |
| 2005/0288955 A1 | 12/2005 | Lewiss-Hachmeister |
| 2006/0151598 A1 | 7/2006 | Chen et al. |
| 2006/0217113 A1 | 9/2006 | Rao et al. |
| 2007/0005426 A1 | 1/2007 | Walker et al. |
| 2007/0092114 A1 | 4/2007 | Ritter et al. |
| 2007/0127470 A1 | 6/2007 | Gaedeken et al. |
| 2007/0136418 A1 | 6/2007 | Wolfe |
| 2007/0255620 A1 | 11/2007 | Tumminaro et al. |
| 2007/0260532 A1 | 11/2007 | Blake, III |
| 2007/0299677 A1 | 12/2007 | Maertz |
| 2008/0009268 A1 | 1/2008 | Ramer et al. |
| 2008/0021767 A1 | 1/2008 | Benson et al. |
| 2008/0040417 A1 | 2/2008 | Juncker |
| 2008/0091535 A1 | 4/2008 | Heiser et al. |
| 2008/0133336 A1 | 6/2008 | Altman et al. |
| 2008/0162224 A1 | 7/2008 | Coon et al. |
| 2008/0162316 A1 | 7/2008 | Rampell et al. |
| 2008/0192677 A1 | 8/2008 | Abusch-Magder et al. |
| 2008/0221986 A1 | 9/2008 | Soicher et al. |
| 2008/0228600 A1 | 9/2008 | Treyz et al. |
| 2008/0235130 A1 | 9/2008 | Malov et al. |
| 2008/0249936 A1 | 10/2008 | Miller et al. |
| 2008/0249941 A1 | 10/2008 | Cooper |
| 2008/0277465 A1 | 11/2008 | Pletz et al. |
| 2008/0301779 A1 | 12/2008 | Garg et al. |
| 2009/0006175 A1 | 1/2009 | Maertz |
| 2009/0043629 A1 | 2/2009 | Price |
| 2009/0094125 A1 | 4/2009 | Killian et al. |
| 2009/0132366 A1 | 5/2009 | Lam et al. |

(56) References Cited

U.S. PATENT DOCUMENTS

| | | |
|---|---|---|
| 2009/0132415 A1 | 5/2009 | Davis et al. |
| 2009/0150238 A1 | 6/2009 | Marsh et al. |
| 2009/0170483 A1 | 7/2009 | Barnett et al. |
| 2009/0172728 A1 | 7/2009 | Shkedi et al. |
| 2009/0187436 A1 | 7/2009 | Shoen et al. |
| 2009/0187543 A1 | 7/2009 | Samborn |
| 2009/0271265 A1 | 10/2009 | Lay et al. |
| 2009/0292599 A1 | 11/2009 | Rampell et al. |
| 2009/0292647 A1 | 11/2009 | Porat et al. |
| 2009/0299865 A1 | 12/2009 | Budgen |
| 2009/0313106 A1 | 12/2009 | Taylor et al. |
| 2009/0319638 A1 | 12/2009 | Faith et al. |
| 2010/0106568 A1 | 4/2010 | Grimes |
| 2010/0131395 A1 | 5/2010 | Allin et al. |
| 2010/0189227 A1* | 7/2010 | Mannar .............. A61B 6/586 378/207 |
| 2010/0250538 A1 | 9/2010 | Richards et al. |
| 2010/0274731 A1 | 10/2010 | Tsitsis |
| 2010/0306763 A1 | 12/2010 | Lambert et al. |
| 2011/0040785 A1 | 2/2011 | Steenberg et al. |
| 2011/0087547 A1 | 4/2011 | Amaro et al. |
| 2011/0182280 A1 | 7/2011 | Chathit |
| 2011/0191149 A1 | 8/2011 | Blackhurst et al. |
| 2011/0191150 A1 | 8/2011 | Blackhurst et al. |
| 2011/0191160 A1 | 8/2011 | Blackhurst et al. |
| 2011/0191173 A1 | 8/2011 | Blackhurst et al. |
| 2011/0191177 A1 | 8/2011 | Blackhurst et al. |
| 2011/0191180 A1 | 8/2011 | Blackhurst et al. |
| 2011/0191181 A1 | 8/2011 | Blackhurst et al. |
| 2011/0191184 A1 | 8/2011 | Blackhurst et al. |
| 2011/0191238 A1 | 8/2011 | Blackhurst et al. |
| 2011/0238499 A1 | 9/2011 | Blackhurst et al. |
| 2011/0238550 A1 | 9/2011 | Reich et al. |
| 2011/0270773 A1 | 11/2011 | Siekman et al. |
| 2011/0302201 A1 | 12/2011 | Ogaz et al. |
| 2012/0016803 A1 | 1/2012 | Tharp |
| 2012/0028635 A1* | 2/2012 | Borg ................... G06Q 10/06 455/423 |
| 2012/0030092 A1 | 2/2012 | Marshall et al. |
| 2012/0190386 A1 | 7/2012 | Anderson |
| 2012/0290230 A1 | 11/2012 | Berges Gonzalez et al. |
| 2013/0006813 A1 | 1/2013 | Carlin et al. |
| 2013/0079931 A1 | 3/2013 | Wanchoo et al. |
| 2013/0096857 A1 | 4/2013 | Chakradhar |
| 2013/0110621 A1 | 5/2013 | Gupta et al. |
| 2013/0132854 A1 | 5/2013 | Raleigh et al. |
| 2013/0185558 A1 | 7/2013 | Seibert et al. |
| 2013/0298242 A1 | 11/2013 | Kumar et al. |
| 2013/0307702 A1 | 11/2013 | Pal et al. |
| 2014/0006529 A1 | 1/2014 | Andreoli-Fang et al. |
| 2014/0047322 A1 | 2/2014 | Kim et al. |
| 2014/0068721 A1 | 3/2014 | Ong et al. |
| 2014/0115324 A1 | 4/2014 | Buer |
| 2014/0226010 A1 | 8/2014 | Molin et al. |
| 2014/0244834 A1 | 8/2014 | Guedalia et al. |
| 2014/0278629 A1 | 9/2014 | Stephenson et al. |
| 2014/0344128 A1 | 11/2014 | Nikankin et al. |
| 2015/0002271 A1 | 1/2015 | Lee et al. |
| 2015/0013001 A1 | 1/2015 | Lee et al. |
| 2015/0081860 A1 | 3/2015 | Kuehnel et al. |
| 2015/0094026 A1 | 4/2015 | Martin |
| 2015/0094093 A1 | 4/2015 | Pierce et al. |
| 2015/0095478 A1 | 4/2015 | Zuerner |
| 2015/0227406 A1 | 8/2015 | Jan et al. |
| 2015/0293574 A1 | 10/2015 | Ehsan |
| 2015/0294553 A1 | 10/2015 | Logan et al. |
| 2015/0312348 A1 | 10/2015 | Lustgarten |
| 2015/0327071 A1 | 11/2015 | Sharma et al. |
| 2015/0358317 A1 | 12/2015 | Deutschmann et al. |
| 2016/0065628 A1 | 3/2016 | Guo et al. |
| 2016/0071334 A1* | 3/2016 | Johnson ............... G07C 5/0808 701/29.1 |
| 2016/0087933 A1 | 3/2016 | Johnson et al. |
| 2016/0132832 A1 | 5/2016 | Pinkovezky et al. |
| 2016/0164919 A1 | 6/2016 | Satish et al. |
| 2016/0210450 A1 | 7/2016 | Su |
| 2016/0217282 A1 | 7/2016 | Vecera et al. |
| 2016/0232336 A1 | 8/2016 | Pitschel et al. |
| 2016/0269411 A1 | 9/2016 | Malachi |
| 2016/0295410 A1 | 10/2016 | Gupta et al. |
| 2016/0300201 A1 | 10/2016 | Li et al. |
| 2016/0328282 A1 | 11/2016 | Rogati et al. |
| 2016/0337869 A1 | 11/2016 | Dai |
| 2016/0342982 A1 | 11/2016 | Thomas et al. |
| 2016/0367415 A1 | 12/2016 | Hayes et al. |
| 2017/0004508 A1 | 1/2017 | Mansfield et al. |
| 2017/0006135 A1 | 1/2017 | Siebel et al. |
| 2017/0017354 A1 | 1/2017 | Wei |
| 2017/0041296 A1 | 2/2017 | Ford et al. |
| 2017/0061442 A1 | 3/2017 | Barlow et al. |
| 2017/0076408 A1 | 3/2017 | D'Souza et al. |
| 2017/0124642 A1 | 5/2017 | Barnett et al. |
| 2017/0171513 A1 | 6/2017 | Nakamura |
| 2017/0178186 A1 | 6/2017 | Craft |
| 2017/0208079 A1 | 7/2017 | Cammarota et al. |
| 2017/0208139 A1 | 7/2017 | Li et al. |
| 2017/0228773 A1 | 8/2017 | Takayama |
| 2017/0235454 A1 | 8/2017 | Selfridge et al. |
| 2017/0244618 A1 | 8/2017 | Deluca et al. |
| 2017/0278133 A1 | 9/2017 | Corrado et al. |
| 2017/0302669 A1 | 10/2017 | Chen et al. |
| 2017/0323345 A1 | 11/2017 | Flowers et al. |
| 2017/0352071 A1 | 12/2017 | Carey et al. |
| 2017/0353859 A1 | 12/2017 | Idnani et al. |
| 2018/0007131 A1 | 1/2018 | Cohn et al. |

OTHER PUBLICATIONS

Guagliardo, Joseph C. et al., "Blockchain: Preparing for Disruption Like Its the 90s"; Mar. 14, 2016, retrieved from http://www.law360.com/articles/77120CVprint?section=ip.

International Preliminary Report on Patentability (IPRP) dated Jul. 31, 2012 for International Application No. PCT/US2011/022765.

International Search Report and the Written Opinion of the International Searching Authority dated Mar. 25, 2011 for International Application No. PCT/US11/22781.

International Search Report and the Written Opinion of the International Searching Authority dated Mar. 25, 2011 for International Application No. PCT/US11/22783.

International Search Report and the Written Opinion of the International Searching Authority dated Mar. 28, 2011 for International Application No. PCT/US11/22771.

International Search Report and the Written Opinion of the International Searching Authority dated Mar. 29, 2011 for International Application No. PCT/US11/22779.

International Search Report and the Written Opinion of the International Searching Authority dated Mar. 29, 2011 for International Application No. PCT/US11/22785.

International Search Report and the Written Opinion of the International Searching Authority dated Apr. 8, 2011 for International Application No. PCT/US11/22765.

* cited by examiner

SECURITY IMPLEMENTATION FOR RESOURCE DISTRIBUTION

CROSS-REFERENCE TO RELATED APPLICATION

The present application is a continuation of U.S. patent application Ser. No. 15/082,591 for a "SECURITY IMPLEMENTATION FOR RESOURCE DISTRIBUTION" (filed Mar. 28, 2016), which is hereby incorporated by reference in its entirety.

BACKGROUND

Systems for providing communications between and amongst devices are known where interconnected devices, often referred to as smart devices, may include communications modules, processors and applications that allow the devices to communicate with one another, and with other devices and/or systems, over a network. Such systems allow the devices to collect and exchange data and are commonly referred to as the internet-of-things.

BRIEF SUMMARY

Embodiments of the present invention provide an innovative system, method and apparatus for securely maintaining and distributing user resources between and amongst interconnected devices.

In some embodiments, a resource management system comprises a network communication interface; a smart device communication interface; and a memory device storing a resource management application. A processing device is operatively coupled to the memory device, wherein the processing device is configured to execute computer-readable program code to: receive from a smart device associated with a first custodian a set of smart device data via the smart device communication interface; detect within the set of smart device data a first subset of data associated with a failure condition of the smart device; and communicate a set of instruction information to a third party system via the network communication interface, wherein the instruction information is usable by the third party system to initiate a targeted communication between a host entity system associated with the smart device and the custodian.

In some example implementations, the set of smart device data comprises an identification of the smart device and a usage profile associated with the smart device. In some such example implementations, and in other example implementations, the set of smart device data further comprises a diagnostic code generated by the smart device.

In some example implementations, detecting within the set of smart device data a first subset of data associated with a failure condition of the smart device comprises comparing the usage profile associated with the smart device to a predetermined standard usage profile. In some such example implementations, and in other example implementations, detecting within the set of smart device data a first subset of data associated with a failure condition of the smart device comprises comparing the diagnostic code against a predetermined set of diagnostic codes associated with the smart device. In some such example implementations, an in other example implementations, the set of instruction information comprises the set of smart device data, an identification of the failure condition, and a set of contact information associated with the custodian.

In some example implementations, the third party system comprises a financial institution system. In some such example implementations, and in other example implementations, the host entity system is associated with an entity associated with the smart device and the failure condition associated with the smart device.

In some embodiments, a method for managing resources comprises: receiving from a smart device associated with a first custodian a set of smart device data via a smart device communication interface; detecting within the set of smart device data a first subset of data associated with a failure condition of the smart device; communicating a set of instruction information to a third party system via a network communication interface, wherein the instruction information is usable by the third party system to initiate a targeted communication between a host entity system associated with the smart device and the custodian.

In some example implementations, the set of smart device data comprises an identification of the smart device and a usage profile associated with the smart device. In some such example implementations, and in other example implementations, the set of smart device data further comprises a diagnostic code generated by the smart device.

In some example implementations, detecting within the set of smart device data a first subset of data associated with a failure condition of the smart device comprises comparing the usage profile associated with the smart device to a predetermined standard usage profile. In some such example implementations, and in other example implementations, detecting within the set of smart device data a first subset of data associated with a failure condition of the smart device comprises comparing the diagnostic code against a predetermined set of diagnostic codes associated with the smart device.

In some example implementations, the set of instruction information comprises the set of smart device data, an identification of the failure condition, and a set of contact information associated with the custodian. In some such example implementations, and in other example implementations, the third party system comprises a financial institution system. In some such example implementations, and in other example implementations, the host entity system is associated with an entity associated with the smart device and the failure condition associated with the smart device.

In some embodiments, a resource management device comprises a network communication interface; a smart device communication interface; a memory device storing a resource management application; and a processing device operatively coupled to the memory device, wherein the processing device is configured to execute computer-readable program code to: receive from a smart device associated with a first custodian a set of smart device data via the smart device communication interface; detect within the set of smart device data a first subset of data associated with a failure condition of the smart device; and in response to detecting the first subset of data associated with a failure condition of the smart device, transmit to the custodian a set of resource management information via the network communication interface.

In some example implementations, the set of smart device data comprises a usage profile associated with the smart device and a diagnostic code associated with the smart device. In some such example implementations, and in other example implementations, the resource management information comprises a set of contact information associated with a host entity system.

In some example implementations, the processing device is further configured to execute computer-readable program code to transmit to the smart device via the smart device communication interface a command to perform a diagnostic protocol associated with the smart device.

DETAILED DESCRIPTION OF EMBODIMENTS OF THE INVENTION

Figure 1:
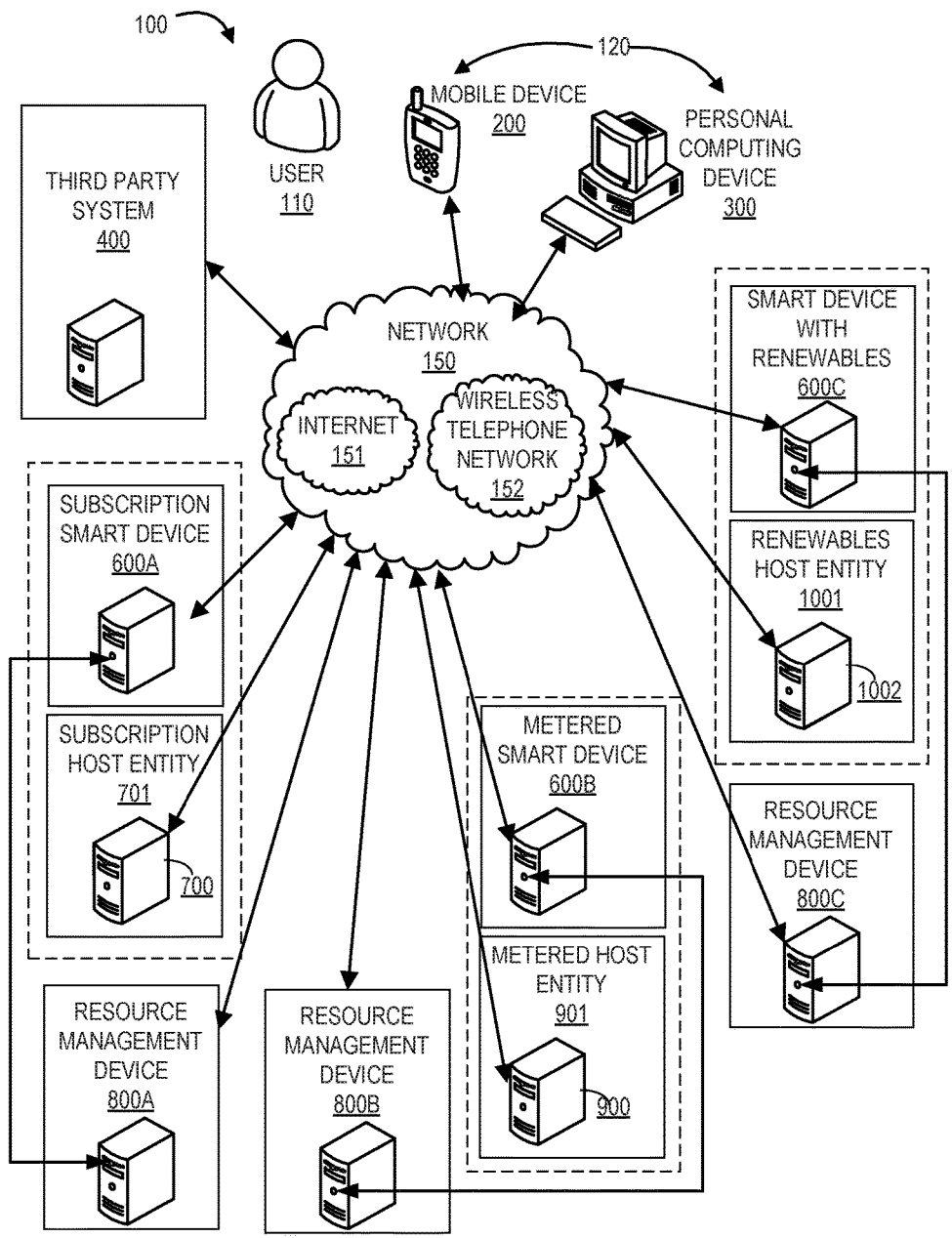
FIG. 1 is a block diagram illustrating a system for security implementation for resource distribution and management, in accordance with embodiments of the invention.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Many of the example implementations discussed and contemplated herein involve at least one "smart device". A "smart device" as used herein means a device, apparatus and/or system that is capable of communicating with and transmitting information or data to and/or receiving information or data from other devices, systems or apparatuses including over a network. The smart device may be for example, but not limited to, a machine such as an automobile, tractor trailer, airplane, manufacturing device, warehouse devices, material handling system, conveyor system, robotics or the like; appliances such as refrigerators, washer/dryers, dish washers, or the like; home entertainment devices or systems such as set top boxes, gaming systems, internet televisions, or the like; home or building systems such as home security systems, utility systems such as electrical, water, plumbing systems and apparatuses such as electric meters, water meters, hot water heaters, gas meters or the like; and personal devices such as wearable devices such as internet capable fitness devices, watches, glasses or the like. The list of smart devices provided herein is not exhaustive such that the smart device may be any device that includes a communication interface or module, software and/or hardware that allow the device to communicate data and/or information related to the device with other devices and/or systems over a network.

In accordance with embodiments of the invention, the term "custodian" refers to and includes any individual, organization, entity, or group thereof, that are responsible for a smart device and/or its maintenance. In some example implementations, a user of a smart device may be a custodian of that device. In many example implementations, particularly those that arise in the context of a home environment, a custodian will be the owner of the device. In other example implementations, such as those that arise in the context of a manufacturing facility, information technology (IT) facility, restaurant or food processing facility, and/or other business enterprise settings, a custodian may be an individual or team of individuals responsible for monitoring, maintaining, repairing, and/or replacing smart devices, or otherwise managing the acquisition, deployment, and/or use of smart devices within or across an enterprise.

As used herein, the term "host" or "host entity" means an entity that operates the smart device for its primary function or that interacts with the smart device for its primary function. For example, a cable service provider is the host entity for a user's cable box and associated cable service. Likewise, a utility, such as a power company, is the host entity for a user's electric meter and associated electric service. Moreover, for smart machines that require renewable products or accessories the host entity is the entity that provides the renewables used by the smart device. In some example implementations, the host entity may be a service company associated with the particular smart device or a class of smart devices. For example, a host entity associated with an HVAC system may be a contractor or tradesperson who installed the system and/or a company who provides maintenance and repair services to HVAC systems. Likewise, a host entity associated with a plumbing system may be a plumber. The "host entity" may comprise a "host system" with a "host entity device" that communicates with other devices described herein.

In accordance with embodiments of the invention, the terms "financial institution" and "financial entity" include any organization that processes financial transactions including, but not limited to, banks, credit unions, savings and loan associations, investment companies, stock brokerages, asset management firms, insurance companies and the like.

Many of the embodiments and example implementations thereof described herein are directed toward solving a pervasive technical problem that consumers at all levels, from individuals to global enterprises, have suffered without reprieve, namely, that critical systems often fail at inopportune times. Moreover, the costs associated with the emergency and/or ad hoc repair, replacement, and other remediation of unanticipated system failures are often much higher (monetarily, and in terms of time, convenience, stress, and other factors impacting individuals and businesses) than timed replacement, targeted repairs, or other interventions that prevent, delay, or mitigate system failure. Examples of such system failure can be highly problematic, such as the failure of HVAC systems during exceptionally hot or cold weather events, the unanticipated failure of critical IT components such as servers and the like, the failure of plumbing components during an extended travel period, vehicle failure on the way to an important meeting, and other unanticipated system failures that impede or impact the normal functioning of an individual, household, or business. While the use of back-up systems (such as emergency generators in the case of electrical systems, fans or space heaters in the case of HVAC systems, and the like) may allow for some limited mitigation of otherwise catastrophic system failure, such back-up systems are often expensive, prone to failure themselves, or otherwise inconvenient. Moreover, the costs of emergency service are often much higher than those associated with normal, scheduled service. Furthermore, when catastrophic system failure mandates the immediate replacement of failed components, it is often impossible to take the time to carefully select replacement components that satisfactorily meet all of the functional, aesthetic, pricing, and other requirements that would be imposed on a planned replacement purchase.

To solve this technical issue and related technical issues, many of the embodiments and example implementations contemplated herein recognize that a smart device may be configured to communicate information about the performance of the smart device that will allow for the identification and/or prediction of a stage in failure that a smart device may be in. For example, a smart device may be configured to communicate a usage pattern or profile, in the sense that the smart device may transmit information about when the smart device is turned on or off, the power consumption of the device, information about the use cycles of the device (such as the number of cycles performed, the duration of cycles, or other such information, for example), the status of consumable components of the device (such as filters, chemicals contained in reservoirs, coolants, lubricants, and other consumable items, for example), the age and/or service life of the device, or other data generated regarding the use and operation of the smart device. In situations where the smart device is able to run self-diagnostic protocols, such as HVAC systems, server systems, or other systems that are equipped to check the functioning of their various component parts and generate diagnostic codes, the smart device may be configured to communicate such diagnostic codes. Such information about the smart device and its functionality can be particularly useful in diagnosing and predicting whether the smart device is likely in need of maintenance, repair, and/or replacement, and when maintenance, repair, and/or replacement may be necessary in the future.

In some example implementations where the smart device is capable of transmitting information, either directly or indirectly, to a financial institution, such information can be particularly useful in permitting users and custodians of smart devices to predict how and when the maintenance, repair, and/or replacement of a smart device will impact them. For example, in situations where the usage pattern and/or diagnostic code(s) generated by a device indicate that maintenance is necessary for a smart device, the financial institution may be able to send a targeted communication to the custodian and/or user of the smart device to indicate that maintenance is necessary. In some such implementations, the targeted communication may include a recommendation regarding an entity that could perform the maintenance (such as the host entity associated with the smart device and/or another entity capable of performing the maintenance), and/or may include estimates about the likely costs of repairs, offers regarding replacement products, loan offerings for funds to be used in connection with the smart device, and other information. In some example implementations, the financial institution may be capable of directly contacting service personnel and coordinating the servicing, repair, and/or replacement of the smart device.

In some example implementations involving a financial institution, additional benefits can be derived through the interaction of one or more smart devices, one or more resource maintenance systems, and a financial institution system. In some example implementations, the financial institution may be able to compare the information about the age and/or potential failure status of a business's servers against historical information regarding the business's cash flow, the pricing of servers, and other market information to identify a time when the business may need to plan to replace the servers, when the business may be able to get a favorable price on the replacement, and/or when the business may be in the best financial position to acquire the replacement. In the context of home environment, the financial institution may be able to detect that numerous appliances (such as a refrigerator, dishwasher, washer, dryer, stove and/or oven) are in various states of age and/or need of repair or replacement. In response to such detection, the financial institution may be able to access information about the user's and/or custodian's preferences, aesthetics, prior purchases, and other information, along with information about trends in the market (such as the availability of new models, pricing trends, aesthetic trends, and other product information), and communicate to the user and/or custodian offers regarding potential replacement options (including but not limited to the identification of retailers or manufacturers from whom such replacement options may be available).

Additional benefits can be derived in example implementations where an entity (such as a financial institution) receives data (either directly or indirectly) from numerous smart devices and/or resource management devices. In such implementations, the entity may be able to develop standard usage profiles and otherwise develop models that allow for the prediction of the failure of a smart device. For example, a financial institution may be able to detect that a subset of its customers purchased a particular model of washing machine that is configured as a smart device. By aggregating and examining the data communicated by each of the smart washing machines, the financial institution may be able to detect a usage pattern that preceded the failure of the washing machine (such as a number of cycles, a change in the draw of electrical energy by the washing machine, a chronological age, a set of diagnostic codes, and/or other information). Moreover, because the financial institution may have improved visibility into the costs incurred by the custodians of the smart washing machines, the financial institution may be able to identify the time at which a custodian may want to take action with respect to the maintenance, repair, and/or replacement of the washing machine to extend the life of the machine and/or obtain the best pricing on a replacement that best fits the preferences and needs of the custodian.

In some example embodiments, the aggregation of information received from multiple smart devices (such as multiple devices associated with one individual or entity, or devices across multiple individuals or entities) and correlation of that information with additional data sets is contemplated. For example, in the context of a system that directs targeted offers users of smart devices, information from smart devices can be aggregated by a system, which can in turn use its ability to communicate with a large collection of potential consumers to secure a discount and/or preferred pricing on an item or service, and subsequently direct the offer to the smart device users. Similarly, the correlation of market information to smart device usage information can be used in some example implementations to identify particularly advantageous time periods during which a transaction can be made, and related offers and/or information can be directed to users of smart devices. In some example implementations, the aggregation of smart device data, along with correlations of that smart device date with other data sets, may be provided to host entities and/or other entities in a manner that improves the functionality, servicing, operation, and/or design of one or more smart devices.

Some example implementations contemplate the use of a portal-type arrangement, wherein a smart device custodian can register smart devices associated with the custodian, manage the use of information acquired from the smart device (such as the application of data usage protocols, management of payment protocols, usage profile monitoring, and the like), and otherwise interact with the information associated with the smart device. In some example implementations, a portal can integrate a graphic user interface that permits a user or custodian to interact with the smart device, the data associated with the smart device, and related protocols, including but not limited to password management, data privacy settings, messages sent by or associated with the smart device, and the like.

FIG. 1 provides a block diagram illustrating an environment 100 for a system for security implementation for user resource distribution and management, in accordance with an embodiment of the invention. In some embodiments, the user resource comprises financial assets that are securely distributed in a payment system associated with the user and/or one or more smart devices. As illustrated in FIG. 1, the environment 100 includes a user 110 where the user represents a customer having a relationship with at least one but typically more than one financial institution. A user of the system may be a person, but may also be a business or any other entity, including but not limited to a custodian of a smart device. In a typical environment thousands of users may access the system of the invention.

The environment 100 also may include a plurality of user devices. The user devices may comprise any machine, apparatus, system or the like that may be connected to and communicate with other devices over network 150. At least one of the devices may comprise a computing device 120 for use by the user 110. The computing device 120 may be any device that employs a processor and memory and can perform computing functions, such as a personal computing device 300 or a mobile device 200, that may be connected to or access network 150. The personal computing device 300 may comprise a personal computer such as a desktop computer, laptop computer, tablet or any type of personal computing device that may be connected to a network by landline or wireless access such as wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. As used herein, the mobile device 200 may comprise any mobile communication device, such as a cellular telecommunications device (i.e., a cell phone or mobile phone), personal digital assistant (PDA), a mobile Internet accessing device, or other mobile device. A mobile device may connect to the network by a cellular telecommunications network or by WiFi, Bluetooth or other access technology. In some embodiments where, for example, the user is an institution the computing device 120 may comprise servers, access terminals, or the like.

The computing device 120 may be configured to communicate over network 150 with at least one third party entity system 400 of a third party entity such as a financial institution and with one or more smart devices and/or resource management devices as will hereinafter be described. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet 151. In one embodiment, the network 150 may also include a wireless telephone network 152.

In general, the computing device 120 is configured to connect with the network 150 and may be used to log the user 110 into the third party entity system 400 of the third party financial institution. A user 110 in order to access the user's account(s) typically uses an online banking application and/or mobile banking application on the third party entity system 400 and must authenticate with the third party entity system 400. For example, logging into the third party entity system 400 generally requires that the user 110 authenticate his/her/its identity using a user name, a passcode, a cookie, a biometric identifier, a private key, a token, and/or another authentication mechanism that is provided by or for the user 110 to the third party entity system 400 via the computing device 120. In some embodiments the authentication system may be a tiered system that may require different levels of authentication based on conditions such as, for example, previous activity of the user over the network 150. For example, the tiered authentication system may have three levels of authentication—hard, medium and soft. Hard authentication may require that the user input a high level of authentication information such as a combination of password, user identification, answer to challenge questions, biometrics, random key number or the like. A hard authentication may be required when the user logs on from an unrecognized user device or where the user activity is not recognized by the system. A medium authentication level may require only a user identification and password. A medium level of authentication may be required where, for example, the user has already logged-in to the computing device 120 using an authentication procedure for the device such as a thumbprint or password. A soft authentication may require only a user identification such as user name. A soft level of authentication may be used, for example, where the user has already logged-in to the computing device 120 using an authentication procedure for the device such as a thumbprint or password and the user has performed activities on the user device that are recognized as "normal" activity for that user and/or the user device is in a recognized location for that user. Thus, the level of authentication required for accessing the banking application, whether online, mobile or in person, may be adjusted based on conditions, activity, functions or information received about or from the user.

Figure 2:
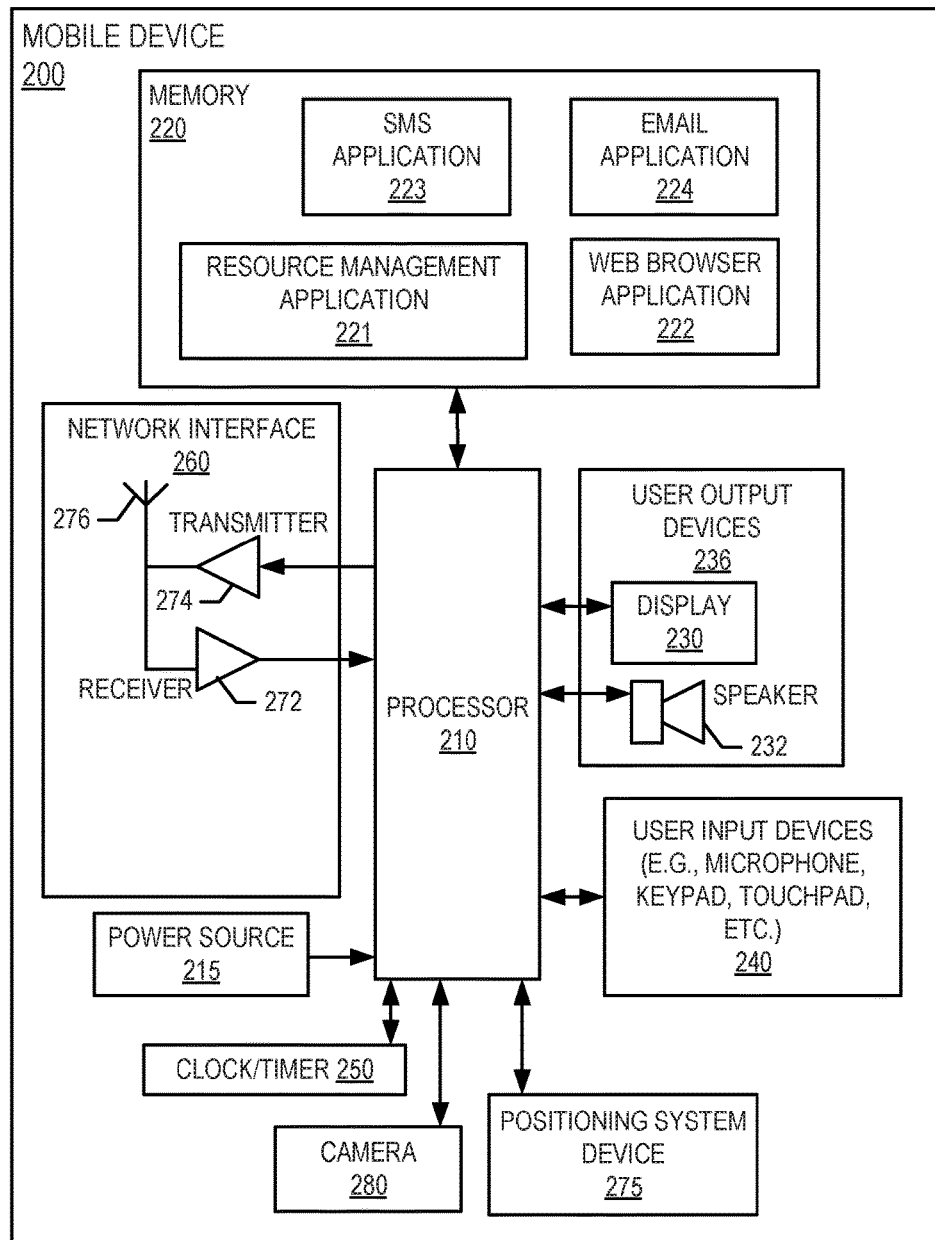
FIG. 2 is a block diagram illustrating the mobile computing device of FIG. 1, in accordance with embodiments of the invention.

FIG. 2 provides a block diagram illustrating a user's mobile device 200 of FIG. 1 in more detail, in accordance with embodiments of the invention. In one embodiment of the invention, the mobile device 200 is a mobile telephone. However, it should be understood that a mobile telephone and the embodiment of the mobile device 200 shown in FIG.

2 are merely illustrative of one type of mobile device 200 that may benefit from, employ, or otherwise be involved with embodiments of the present invention and, therefore, should not be taken to limit the scope of embodiments of the present invention. Other types of mobile devices 200 may include portable digital assistants (PDAs), pagers, tablets, mobile televisions, gaming devices, laptop computers, cameras, video recorders, audio/video player, radio, GPS devices, or any combination of the aforementioned.

Some embodiments of the mobile device 200 include a processor 210 communicably coupled to such devices as a memory 220, user output devices 236, user input devices 240, and a network interface 260. The mobile device 200 further includes a power source 215, such as a battery, for powering various circuits and other devices that are used to operate the mobile device 200. Embodiments of the mobile device 200 may also include a clock or other timer 250 configured to determine and, in some cases, communicate actual or relative time to the processor 210 or one or more other devices. The processor 210, and other processing devices described herein, generally include circuitry for implementing communication and/or logic functions of the associated device. For example, the processor 210 may include a digital signal processor device, a microprocessor device, and various analog to digital converters, digital to analog converters, and/or other support circuits. Control and signal processing functions of the mobile device 200 are allocated between these devices according to their respective capabilities. The processor 210 thus may also include the functionality to encode and interleave messages and data prior to modulation and transmission. The processor 210 can additionally include an internal data modem. Further, the processor 210 may include functionality to operate one or more software programs, which may be stored in the memory 220. For example, the processor 210 may be capable of operating a connectivity program, such as a web browser application 222. The web browser application 222 may then allow the mobile device 200 to transmit and receive web content, such as, for example, location-based content and/or other web page content, according to a Wireless Application Protocol (WAP), Hypertext Transfer Protocol (HTTP), and/or the like. The memory device 220 may include other applications such as e-mail application 224 and SMS application 223.

The processor 210 is configured to use the network interface 260 to communicate with one or more other devices on the network 150. In this regard, the network interface 260 includes an antenna 276 operatively coupled to a transmitter 274 and a receiver 272 (together a "transceiver"). The processor 210 is configured to provide signals to and receive signals from the transmitter 274 and receiver 272, respectively. The signals may include signaling information in accordance with the air interface standard of the applicable cellular system of the wireless telephone network 152. In this regard, the mobile device 200 may be configured to operate with one or more air interface standards, communication protocols, modulation types, and access types. By way of illustration, the mobile device 200 may be configured to operate in accordance with any of a number of first, second, third, and/or fourth-generation communication protocols and/or the like. For example, the mobile device 200 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Consolidated Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols and/or the like. The mobile device 200 may also be configured to operate in accordance with non-cellular communication mechanisms, such as via a wireless local area network (WLAN) or other communication/data networks. The processor 210 may also be configured to use a camera 280 to capture and/or recognize images and/or a positioning system device 275, such as a compass, GPS system, or other device capable of identifying a position and/or location of the mobile device 200.

As described above, the mobile device 200 has a user interface that may be made up of user output devices 236 and/or user input devices 240. The user output devices 236 include a display 230 (e.g., a liquid crystal display or the like) and a speaker 232 or other audio device, which are operatively coupled to the processor 210. The user input devices 240, which allow the mobile device 200 to transmit data, may include any of a number of devices allowing the mobile device 200 to transmit data, such as a keypad, keyboard, touch-screen, touchpad, microphone, mouse, joystick, other pointer device, button, soft key, and/or other input device(s).

The memory 220 is operatively coupled to the processor 210. As used herein, "memory" or "memory device" includes any computer readable medium (as defined herein below) configured to store data, code, or other information. The memory 220 may include volatile memory, such as volatile Random Access Memory (RAM) including a cache area for the temporary storage of data. The memory 220 may also include non-volatile memory, which can be embedded and/or may be removable. The non-volatile memory can additionally or alternatively include an electrically erasable programmable read-only memory (EEPROM), flash memory or the like.

The memory 220 can store any of a number of applications which comprise computer-executable instructions/code executed by the processor 210 to implement the functions of the mobile 200 and/or one or more of the process/method steps described herein. The memory 220 includes a resource management application 221 that may be used to allow communication with a third party system such as the third party entity system 400 and/or the smart devices to implement the system of the invention. The use of the resource management application 221 may facilitate access to the system of the invention by providing log-in systems including user authentication systems, account information, system controls or the like. The resource management application 221 also communicates with the smart devices and the third party entity system 400 to allow the user to set up and/or control the system of the invention.

These applications also typically provide a graphical user interface (GUI) on the display 230 that allows the user 110 to communicate with the mobile device 200, the third party entity system 400 and/or other devices or systems. The memory 220 can also store any of a number of pieces of information, and data, used by the mobile device 200 and the applications and devices that make up the mobile device 200 or are in communication with the mobile device 200 to implement the functions of the mobile device 200 and/or the other systems described herein. For example, the memory 220 may include such data as user authentication information.

Figure 3:
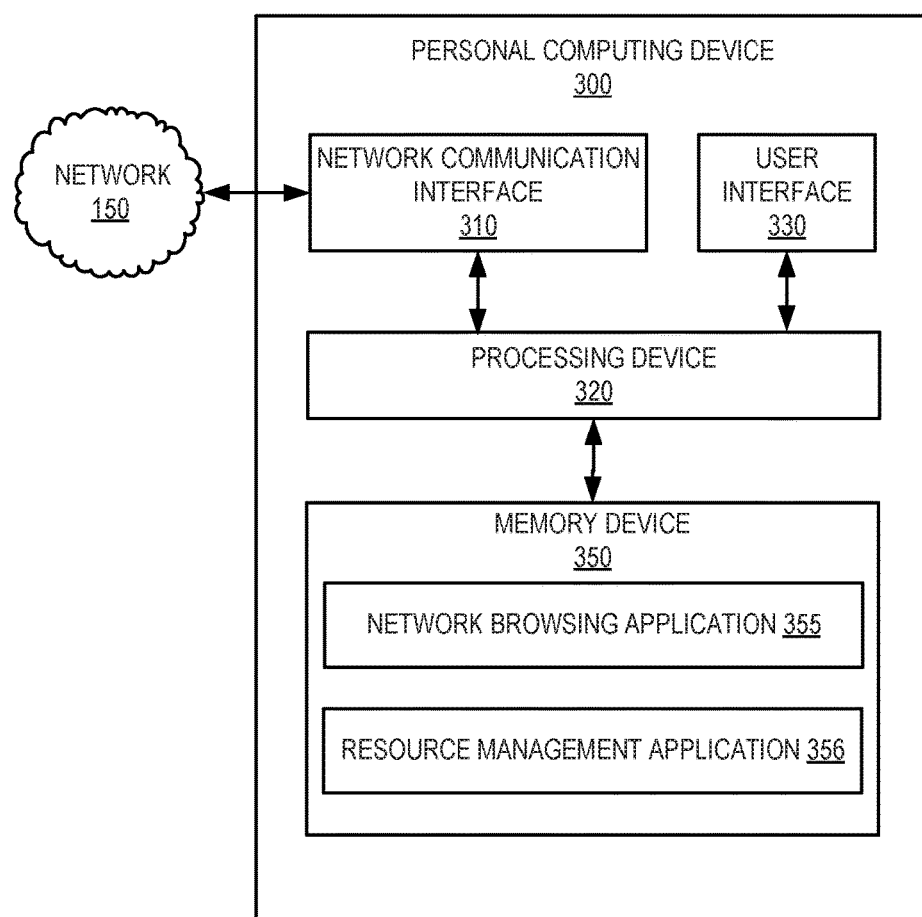
FIG. 3 is a block diagram illustrating the personal computing device of FIG. 1, in accordance with embodiments of the invention.

Referring now to FIG. 3, the personal computing device 300 also includes various features, such as a network communication interface 310, a processing device 320, a user interface 330, and a memory device 350. The network communication interface 310 includes a device that allows the personal computing device 300 to communicate over the network 150 (shown in FIG. 1). In one embodiment of the invention, a network browsing application 355 provides for a user to establish network communication with a third party entity system 400.

As used herein, a "processor" or "processing device," such as the processing device 320, generally refers to a device or combination of devices having circuitry used for implementing the communication and/or logic functions of a particular system. For example, a processing device 320 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 320 may further include functionality to operate one or more software programs based on computer-executable program code thereof, which may be stored in memory device 350. As the phrase is used herein, a processor or processing device may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface" generally includes a plurality of interface devices and/or software that allow a customer to input commands and data to direct the processing device to execute instructions. For example, the user interface 330 presented in FIG. 3 may include a graphical user interface (GUI) or an interface to input computer-executable instructions that direct the processing device 320 to carry out specific functions. The user interface 330 employs certain input and output devices as previously described with reference to FIGS. 1 and 2. These input and output devices may include a display, mouse, keyboard, button, touchpad, touch screen, microphone, speaker, LED, light, joystick, switch, buzzer, bell, and/or other user input/output device for communicating with one or more users.

As used herein, a "memory" or "memory device" generally refers to a device or combination of devices that store one or more forms of computer-readable media for storing data and/or computer-executable program code/instructions. Computer-readable media is defined in greater detail below. For example, in one embodiment, the memory device 350 includes any computer memory that provides an actual or virtual space to temporarily or permanently store data and/or commands provided to the processing device 320 when it carries out its functions described herein. The memory device 350 may include such applications as a conventional web browser application 355 and/or a resource management application 356. The resource management application 356 may be used to allow communication with the third party entity such as the third party entity system 400 to provide access to the financial institution providing log-in systems including user authentication systems, account information or the like as previously described with respect to FIG. 2.

Figure 4:
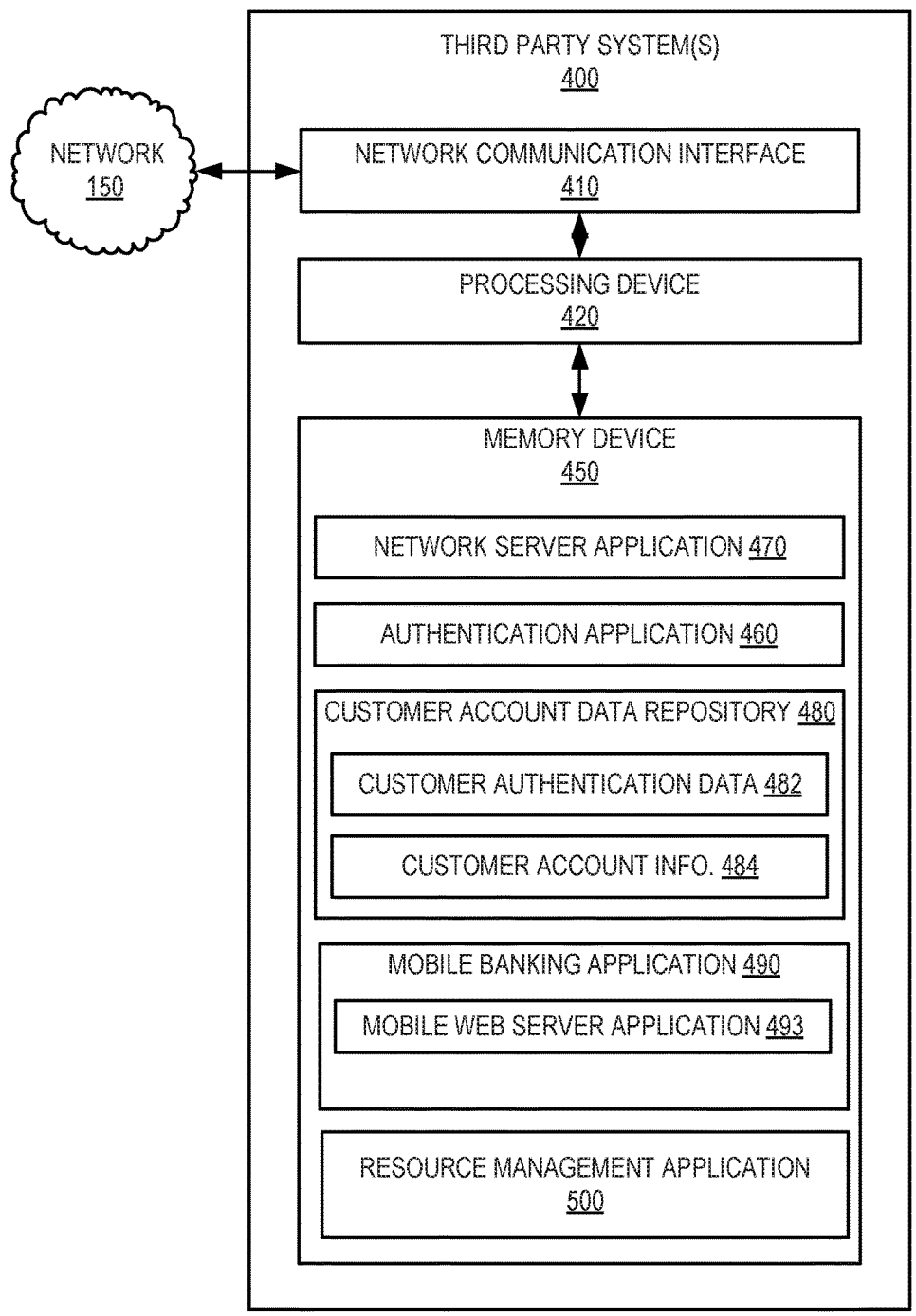
FIG. 4 is a block diagram illustrating the third party system of FIG. 1, in accordance with embodiments of the invention.

FIG. 4 provides a block diagram illustrating the third party system such as third party entity system 400, in greater detail, in accordance with embodiments of the invention. As illustrated in FIG. 4, in one embodiment of the invention, the third party entity system 400 includes one or more processing devices 420 operatively coupled to a network communication interface 410 and a memory device 450. In certain embodiments, the third party entity system 400 is operated by an entity, such as a financial institution.

It should be understood that the memory device 450 may include one or more databases or other data structures/repositories. The memory device 450 also includes computer-executable program code that instructs the processing device 420 to operate the network communication interface 410 to perform certain communication functions of the third party entity system 400 described herein. For example, in one embodiment of the third party entity system 400, the memory device 450 includes, but is not limited to, a network server application 470, an authentication application 460, a customer account data repository 480 which includes customer authentication data 482 and customer account information 484, a mobile banking application 490 comprising a mobile web server application 493, and other computer-executable instructions or other data. The computer-executable program code of the network server application 470, the authentication application 460, or the mobile banking application 490 may instruct the processing device 420 to perform certain logic, data-processing, and data-storing functions of the third party system(s) 400 described herein, as well as communication functions of the third party system(s) 400. The mobile banking application 490 communicates with the user computing devices 120 to facilitate communication between the user and the financial institution.

In one embodiment, the customer account data repository 480 includes customer authentication data 482 and customer account information 484. The network server application 470, the authentication application 460, and the mobile banking application 490 are configured to invoke or use the customer account information 484, the customer authentication data 482 when authenticating a user to the third party system(s) 400.

The third party entity system 400 further includes a resource management application 500 that communicates with the smart devices 600 and may communicate with the user's computing devices 120. The resource management application 500 functions to manage a user's resources as informed by the resource management application 856 of the resource management device 800. In some embodiments, the resource management application 500 is a payment application that provides a payment rail to entities associated with the smart devices as will be described and allows the user to establish and control the payment rail.

As used herein, a "communication interface" generally includes a modem, server, transceiver, and/or other device for communicating with other devices on a network. The network communication interface 410 is a communication interface having one or more communication devices configured to communicate with one or more other devices on the network 150, such as the mobile device 200, the personal computing device 300, and the resource management device 800 and/or the smart device 600. The processing device 420 is configured to use the network communication interface 410 to transmit and/or receive data and/or commands to and/or from the other devices connected to the network 150.

Figure 5:
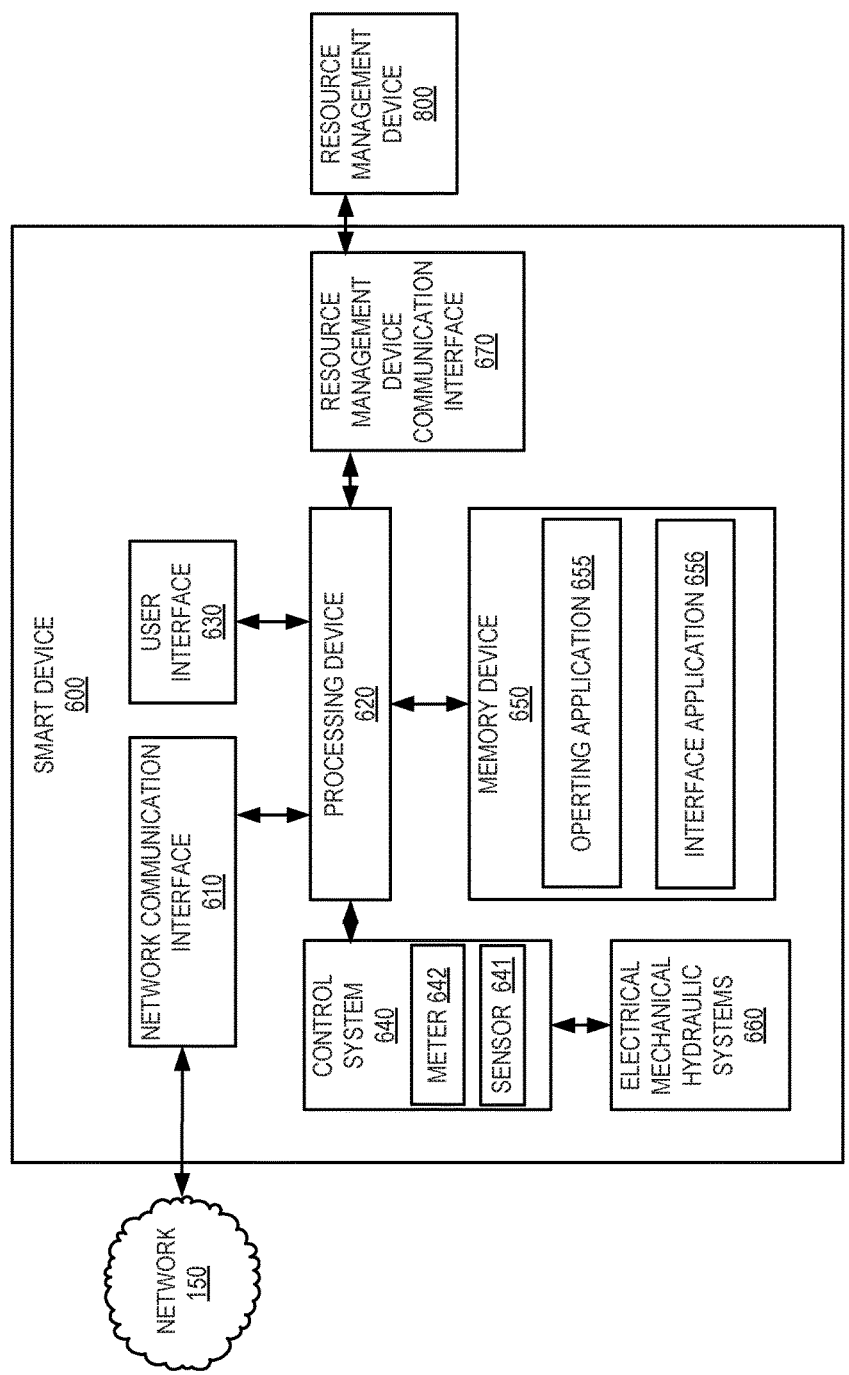
FIG. 5 is a block diagram illustrating an exemplary smart device, in accordance with embodiments of the invention.

FIG. 5 provides a block diagram illustrating smart device 600, in accordance with embodiments of the invention. A "smart device" as used herein means a device, apparatus and/or system that is capable of communicating with and transmitting information or data to and/or receiving information or data from other devices, systems or apparatuses including over network 150. FIG. 5 illustrates an exemplary embodiment of a smart device. The smart device 600 may be for example, but not limited to, a machine such as an automobile, tractor trailer, airplane, manufacturing device, warehouse devices, material handling system, conveyor system, robotics or the like; appliances such as refrigerators, washer/dryers, dish washers, or the like; home entertainment devices or systems such as set top boxes, gaming systems, internet televisions, or the like; home or building systems such as home security systems, utility systems such as electrical, water, plumbing systems and apparatuses such as electric meters, water meters, hot water heaters, gas meters or the like; and personal devices such as wearable devices such as internet capable fitness devices, watches, glasses or the like. The list of smart devices provided herein is not exhaustive such that the smart device 600 may be any device that includes a communication interface or module, software and/or hardware that allow the device to communicate data and/or information related to the device with other devices and/or systems over network 150.

As illustrated in FIG. 5, one exemplary embodiment of a smart device 600 may generally include, but is not limited to, a network communication interface 610, a processing device 620, and a memory device 650 such as described herein. The processing device 620 is operatively coupled to the network communication interface 610 and the memory device 650. The smart device may also have a control system 640 for controlling the physical operation of the device. The control system may comprise one or more sensors 641 for detecting operating conditions of the various mechanical and electrical systems 660 that comprise the smart device or of the environment in which the smart device is used. The sensors 641 may communicate with the processing device 620 to provide feedback to the operating systems of the device. The control system 640 may also comprise metering devices 642 for measuring performance characteristics of the smart device. The control system 640 may also comprise controllers such as programmable logic controllers (PLC), proportional integral derivative controllers (PID) or other machine controllers. The smart device may also comprise various electrical, mechanical, hydraulic or other systems 660 that perform various functions of the smart device. These systems may comprise, for example, electrical circuits, motors, compressors, or any system that enables functioning of the smart device.

In one embodiment, applications having computer-executable program code that instruct the processing device 620 to operate the various systems of the smart device including network communication interface 610 to perform certain communication functions and to perform certain logic, data processing, and data storing functions of the application as described herein are stored in memory device 650. The applications may include a smart device operating application 655 that controls the various systems 640, 660 and functions of the smart device to control operation of the smart device during use.

The network communication interface 610 is a communication interface having one or more communication devices configured to communicate with one or more other devices on the network 150. The processing device 620 is configured to use the network communication interface 610 to receive information from and/or provide information and commands to other devices and systems via the network 150. The network communication interface 610 may be over a wireless connection or a wired connection such as described above. The smart device may also comprise a user interface 630. The user interface allows inbound and/or outbound communication with the smart device and may take a wide variety of forms depending on the type of smart device. The user interface may comprise interface devices as previously described with respect to FIGS. 3 and 4 and/or may comprise other user interface devices such as appliance input devices such as push buttons, entertainment input devices such as remote controls, vehicle input devices such as found on an automobiles infotainment systems or the like. In some embodiments the input device may be controlled by the host entity such that the smart device is secure. For example, with a utility meter the user interface 630 may be controlled by the utility. In some embodiments, such as utility meters the input device may be a specialized plug-in device or it may be remote from the smart device and may access the smart device over a public or private network.

The smart device may also include a resource management device communication interface 670 that allows the smart device 600 to be connected to and to communicate with a resource management device 800. The resource management device communication interface may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface the smart device may also include a communication interface that may be connected by a hardwire connection to the resource management device. The communication interface may comprise a connector such as a USB, SATA, PATA, SAS or other data connector for transmitting data to and from the smart device. In some embodiments the smart device may comprise a port or plug that is compatible with a mating port or plug on the resource management device. In some embodiments the network communication interface 610 may function as both the network interface device and the resource management device communication interface 670.

Figure 6:
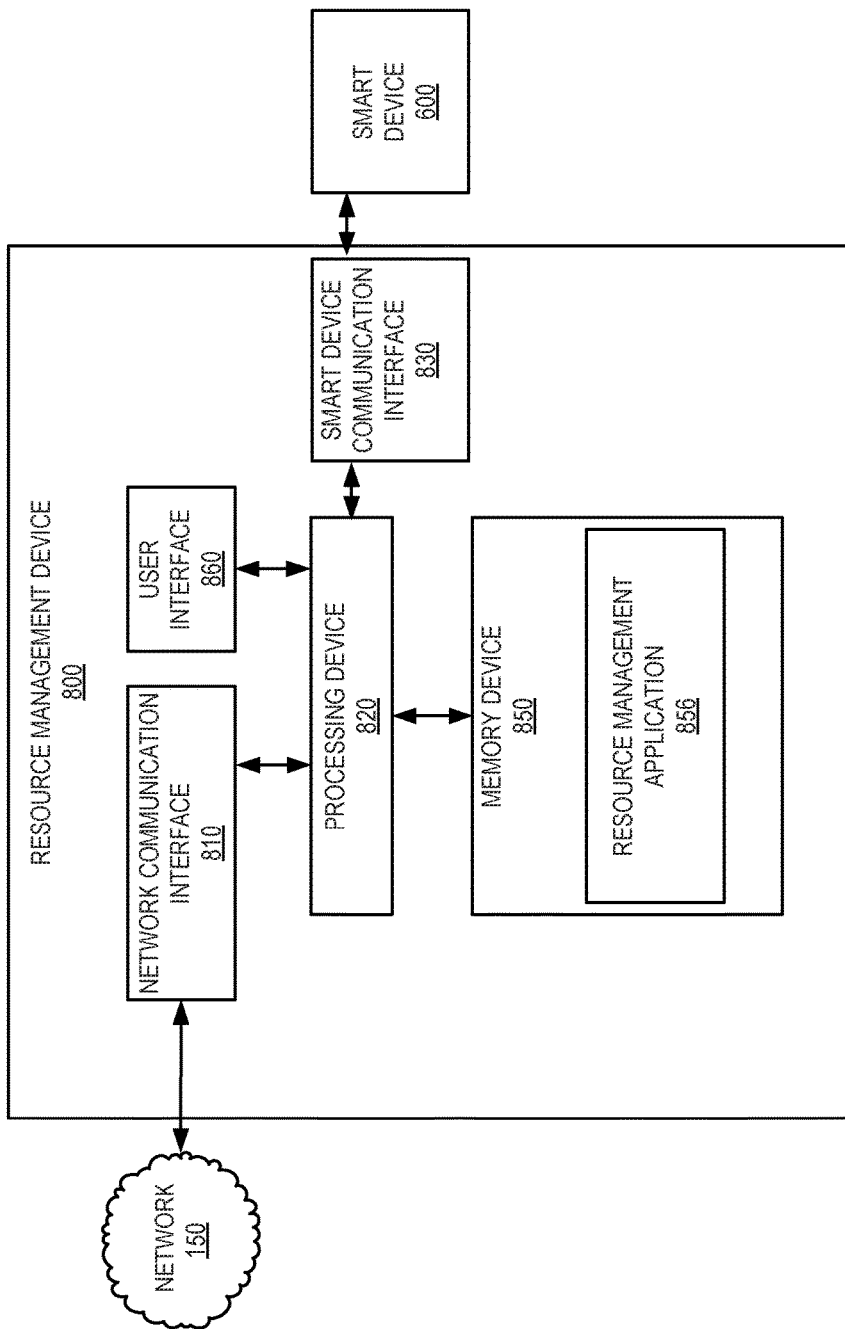
FIG. 6 is a block diagram illustrating an exemplary resource distribution and management device, in accordance with embodiments of the invention.

As illustrated in FIG. 6, one exemplary resource management device 800 may generally include, but is not limited to, a network communication interface 810, a smart device communication interface 830, a processing device 820, and a memory device 850 such as described herein. The processing device 820 is operatively coupled to the network communication interface 810, the smart device communication interface 830 and the memory device 850. In one embodiment, applications having computer-executable program code that instructs the processing device 820 to operate the various functions of the resource management device to perform certain communication functions and to perform certain logic, data processing, and data storing functions of the application as described herein are stored in memory device 850. The applications may comprise a resource management application 856 that communicates with the smart device 600 and the third party system 400 as will be described.

The network communication interface 810 is a communication interface having one or more communication devices configured to communicate with one or more other devices on the network 150. The processing device 820 is configured to use the network communication interface 810 to receive information from and/or provide information and commands to other devices and systems via the network 150. The network communication interface 810 may be over a wireless connection or a wired connection such as described above. The resource management device 800 may also include a smart device communication interface device 830 that allows the resource management device 800 to be connected to and to communicate with a smart device 600. The smart device communication interface device 830 may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface the resource management device 800 may also include a communication interface device that may be connected by a hardwire connection to the smart device. The communication interface device may comprise a connector such as a USB, SATA, PATA, SAS or other data connector for transmitting data to and from the smart device 600. In some embodiments the smart device communication interface device 830 may comprise a port or plug that is compatible with a mating port or plug on the smart device. In some embodiments the network communication interface 810 may function as both the network interface device and the smart device communication interface 830. The smart device communication interface 830 of the resource management device 800 is operatively coupled to the resource management device communication interface 670 of the smart device 600 to allow the smart device 600 to communicate with the resource management device 800. The interfaces 670 and 830 allow host information to be communicated between the smart device and the resource management device where host information may comprise any information used by the resource management device 800 to transmit the data and/or and initiate a secure management of resources in connection with the third party system.

The resource management device 800 may also comprise a user interface 860. The user interface 860 allows inbound and/or outbound communication with the resource management device and may take a wide variety of forms depending on the type of resource management device 800. The user interface may comprise interface devices as previously described with respect to FIGS. 3, 4, and/or 5 may comprise other user interface devices. In some embodiments the input device may be controlled by the third party entity such that the resource management device 800 is secure. In some embodiments, such as with utility meters the input device may be a specialized plug-in device or it may be remote from the resource management device 800 and may access the resource management device 800 over a public or private network.

In one embodiment, the resource management application 856, processing device 820 and the memory device 850 are operable to communicate with and/or effect a transaction with a third party system 400. The smart device may be programmed with an interface application 656 during manufacture of the smart device 600 to interact and complete a data exchange with the resource management device 800. The resource management application 856 of resource management device 800 communicates with a third party system such as third party entity system 400 that is not related to the host entity of the smart device 600. In other words the resource management device 800 is programmed with the resource management application 856 to communicate with a third party system (e.g. the third party entity system 400) where the third party system is operated and managed by an entity that is independent of the host system.

The term "host entity" as used herein means the entity that operates the smart device for its primary function or that interacts with the smart device for its primary function. For example, a cable service provider is a host entity for a user's cable box and associated cable service. Likewise, a utility, such as a power company, is a host entity for a user's electric meter and associated electric service. Moreover, for smart machines that require renewable products or accessories a host entity is the entity that provides the renewables used by the smart device. In some example implementations, a host entity may be a service company associated with the particular smart device or a class of smart devices. For example, a host entity associated with an HVAC system may be a contractor or tradesperson who installed the system and/or a company who provides maintenance and repair services to HVAC systems. Likewise, a host entity associated with a plumbing system may be a plumber. The "host entity" may comprise a "host system" with a "host entity device" that communicates with other devices described herein. As used herein "third party entity" refers to an entity that is not the host entity and that utilizes the resource management application 856 to distribute resources on behalf of a user. The "third party entity" may comprise a "third party system" with a "third party device" that communicates with other devices described herein. For example, the third party entity may be a financial institution that provides a payment rail to the host entity for services or products associated with the smart device and/or otherwise communicates with the host entity regarding aspects of the smart device. Specific example embodiments of the operation of the system will be provided. In one example embodiment, the third party system is the third party entity system 400 of a financial institution and the resource management between the smart device, the host entity and the financial institution is a financial transaction that may comprise a payment from the user's financial institution to the host entity and/or a communication regarding the maintenance, repair, and/or replacement of the smart device and the payment therefor.

Referring to FIGS. 1, 5 and 6, an embodiment of one process and system will be described. In this embodiment the smart device 600a comprises a device that requires a predetermined payment by the user to enable operation of the device and/or provision of a service over that device. Example embodiments of such devices and services are systems that require the user to enter into a contract or subscription with a service provider where the terms of the contract or subscription require agreed upon payments in order for the user to obtain the contracted for service. Such systems are referred to herein as "subscription" systems, services and devices. Common examples of such subscription devices include, but are not limited to, cellular phones, tablets, laptop computers, personal computers, set top boxes, wearable devices, land line phones, receivers such as cable boxes, satellite receivers, internet ready televisions, or the like. Such devices may provide cellular phone service, entertainment services such as cable, satellite, internet that provide television, movie, news, music or other content to a user. Other examples of such devices and services are automobiles with wireless audio connectivity, and security systems with control boxes having wireless or hard wired connectivity. Still other examples of such devices and services are connected gaming systems and consoles. In these and other similar systems the operation of the system, the provision of content and/or services associated with system and the manufacture, sale, lease, installation or other provision of devices is controlled and/or provided by one or more host entities 701. For example, the host entity may comprise, but is not limited to, cable television provider, a phone service company, a satellite television/radio provider, a gaming company, an ISP, an automobile manufacturer, a security company, a content provider or other entity. In some embodiments the entity that provides the smart device and the entity that provides the associated service may be different entities where one or both of the entities may be a host entity. For example, a television manufacturer may provide an internet ready television but the service may be provided by a separate content provider such as an internet streaming service. In other embodiments the host entity provides both the smart device and the associated service. For example, with the example of cable television the host entity may comprise the cable system operator that manufactures or contracts for the manufacture of equipment, installs the infrastructure, sells or leases the equipment to the end user and arranges the provision of content to the user. The user may pay for the subscribed service either in regular installments or on a per use basis. For example, the user may pay a regular monthly payment and/or an on-demand per use rental fee. The terms and conditions of the payments may be maintained in the memory device 850 of the resource management device 800a and are accessible to the resource management application 856.

In one embodiment of the invention, the resource management device 800a is programmed with a resource management application 856 that provides for the acquisition and transmission of data regarding the functionality of the smart device 600a such as a usage profile and/or diagnostic code associated with the smart device 600a such that communication of a set of smart device data and instruction information related thereto may be initiated by the resource management device 800a in cooperation with smart device 600a. The resource management device 800a is in machine to machine communication with the smart device 600a over communication interfaces 670, 830. The resource management device 800a is in direct machine to machine communication with the third party system 400 over network 150. The resource management device 800a functions to initiate and/or effectuate a targeted communication with the host entity system 700 of the host entity 701. In one embodiment the resource management application 856 of resource management device 800 transmits a secured request such as a token to the third party system 400 over network 150 via network communication interface 810 based on information stored in memory device 850 and/or as provided by the smart device 600a to the resource management device 800a. The secured request comprises resource management information where resource management information is a set of instruction information (such as a set of smart device data, an identification of a failure condition of the smart device, and a set of contact information associated with the custodian or user of the smart device), that the third party system uses to initiate a targeted communication with the host entity 701 and/or between the host entity 701 and a custodian (such as user 110 of smart device 600a. In a system that uses a token or other secured request, the resource management information may have no intrinsic value. The secured request is informed by and transmitted in accordance with the terms, conditions, or other rules set by the third party entity system 400 and/or the subscription host entity 701. For example, a secured request may be sent requesting periodic service or maintenance of a smart device 600a associated with host entity 701 and user 110. Tokenization security systems are known where a token having no intrinsic value is substituted for sensitive data such that the authorization does not involve the transmission of sensitive data. As a result, security is enhanced and security risks from data breaches are reduced. In the present invention, the token may be substituted for user and/or custodian account information, personal identification information, and/or potentially sensitive information about a damaged smart device, such that the token generated by the resource management device 800 may be attributed to a user and/or custodian account at the third party system 400. The smart device 600a and host entity 701 may not have user account information or other potentially sensitive information which is instead securely maintained by the third party system 400. As a result, the security of the user's financial or otherwise sensitive information can be maintained by a single entity such that security over the user's financial or otherwise sensitive information may be controlled and enhanced. The resource management device 800a generates the secured request based on the smart device information using the resource management application 856 and transmits the secured request and/or instruction information using network communication interface 810 to the third party system 400 over network 150. The secured request and/or instruction information is received by the third party system 400 and the resource management information (such as a set of instruction information associated with a failure condition of a smart device) in the request is recognized by the third party system 400. Upon receiving the resource management information, the third party system 400 transmits information to the host entity system 700 in accordance with the resource management application 500. Where the resource management application 856 is an application configured to relay smart device usage and/or failure condition information and instruction information thereto, the third party system 400, using resource management application 500, generates a transmission to the host entity 701 that can be used to initiate a targeted communication between the host entity and the custodian of the smart device 600a. For example, the third party system 400 may transmit a message to the host entity 701 that includes information about the smart device 600a, a failure condition thereof, contact information for the custodian of device 600a and an indication that the host entity 701 should contact the custodian.

The terms and conditions of the resource management and communication associated therewith may be agreed to by the user/custodian and the third party entity and stored in resource management application 500. For example where the resource management application is a maintenance, repair, and/or replacement application, such as an application that monitors the status of a smart device, the terms and conditions of the service and contact related to service may be established. Upon taking control of, installing or otherwise accessing the resource management device 800a, the user or custodian may register the resource management device 800a with the third party entity such that the third party entity recognizes a secured request from that resource management device 800a as belonging to that user. The user/custodian may access the user's and/or custodian's account via an on-line application through a user device 120 to register the resource management device 800a with the third party entity. In the case of a financial institution the user may register the resource management device 800a through the on-line banking application 490. The user may also register the resource management device 800a with the third party system other than using an on-line application. In some embodiments the resource management device 800a may register itself with the third party entity based on information provided to the resource management device 800a by the user during start-up of the smart device.

Referring again to FIGS. 1, 5 and 6, the smart device 600b may comprise a smart device that meters usage of a product or service where payment by the user is based on usage levels. Example embodiments of such devices and services are systems such as utilities including, but not limited to, water utilities, electrical utilities, gas utilities that utilize meters to determine usage. With the system of the invention, the smart device 600b comprises a meter 642 or other sensor 641. The resource management application 856 provides for monitoring of user's usage of the resource management device 800b, and may also monitor other aspects of a usage profile of the resource management device 800b, including but not limited to the recognition of diagnostic codes generated by the resource management device 800b. As depicted in FIG. 1, resource management device 800b is in machine to machine communication with the third party entity system 400. In one embodiment, the resource management application 856 comprises a maintenance application that transmits a secured request such as a token to the third party entity system 400. The secured request is received by the third party entity system 400 and is recognized as an instruction to initiate a targeted communication between the host system 900, e.g. the utility or other host entity 901 that operates the smart device 600b, and the custodian of smart device 600b to provide service and/or replacement of the smart device 600b. The resource management device 800b generates a secured request based on the resource management application 856 embedded in the resource management device 800 and transmits the secured request to the third party entity system 400 using interface 810 over network 150. Upon receiving and recognizing the secured request, the third party system 400 may generate a message to the host entity system 900 based upon the terms with the user and/or custodian. The message is received by the host entity system 900 and the host entity system may send a targeted communication to the custodian of smart device 600b to regarding the service need of the custodian.

As also shown in FIG. 1, the smart device 600c may comprise a device that is used with a renewable product. Example embodiments of such devices and systems include water filtration systems that require new filters; water softener systems that require salt; appliances such as washing machines, dryers, dishwashers, and the like that require detergent, bleach, fabric softeners and the like; HVAC systems that require air filters; automobiles, boats, trucks and other vehicles that require oil, filters, light bulbs or the like. Other examples of such systems are smart home/ building systems where systems such as HVAC, security systems, utilities, lighting, or the like may include interconnected smart devices that may include one or more of the devices discussed above. In a smart system the renewable product may include one or more of the renewable products discussed above in addition to other renewable products such as light bulbs, trash can liners, food, batteries or any renewable product. The smart device 600c may also include devices such as a refrigerator that monitors food usage, a trash can that monitors trash bag liner usage, a home electrical smart grid, smart lamps, or light fixtures that monitor light bulb operation or other devices and systems. The embodiments described above are by way of example only and a wide variety of devices and systems may be used in the system of the invention.

Typically the smart device 600c may include one or more sensors 641 that detect or determine a status of the renewable product or the smart device may include program logic in operating application 655 and/or resource management application 656 that estimates the status of the renewable product. The smart device 600c may include a sensor 641 that directly monitors the status of the renewable product. For example, in a water filtration system the sensor 641 may monitor the water flow rate through the water filter; in a HVAC system the sensor 641 may monitor the air flow rate through the air filter; in a lighting system the sensor 641 may monitor the current drawn by a light bulb in a fixture; in a refrigerator the sensor 641 may monitor the weight of a gallon of milk. The embodiments described above are by way of example only and are not intended to be limiting and a wide variety of devices and systems may be used in the system of the invention. In other embodiments, the status of the renewable product may be determined by program logic rather than the direct monitoring of the renewable product. For example, the status of the renewable product may be based on time intervals, usage rates, or the like. For example, in an HVAC system or water filtration system the replacement of a filter may be determined by a calculation of hours of usage rather than flow rate through the filter; in a "smart refrigerator" food may be evaluated based on time intervals (e.g. a carton of milk ordered every week) rather than on direct testing of the product. The host entity 1001 may comprise any entity having a host entity system 1002 from which the smart device 600c can order the renewable product over network 150 and/or from which the smart device can receive maintenance, repair, or other services. For example the host entity may comprise a service business with an on-line presence, an e-commerce site, a dedicated web site, a host entity web site or the like.

In systems that use a renewable product such as those described above, the smart device 600c may order periodic service (such as the delivery and/or installation of replacement products) when replacement of the renewable product is determined by the smart device 600c and/or the resource management device 800c. The order may be placed by the smart device 600c to a host entity system 1002 of host entity 1001. The host entity may be a dedicated source of the renewable product, such as a water filtration system manufacturer/operator that provides replacement water filters, or the host entity may be an on-line retailer that is unrelated to the smart machine other than acting as the source of the renewable product. In either event the smart device 600c is in machine to machine communication with the host entity system 1002 of the host entity selling or providing the renewable product over network 150. The smart device 600c is also in machine to machine communication with resource management device 800c over communication interfaces 670, 830. The operating application 655 of the smart device 600c initiates the order for the appropriate service and/or renewable product. The order may be based on the output of a sensor or program logic. When the smart device determines that a renewable is needed or that service may be necessary, the resource management application 856 of resource management device 800c causes a message is transmitted over the communication interfaces 670, 830 for the resource management device to send a secured request such as a token to the third party entity system 400. The secured request is received by the third party system 400 (e.g. the user's bank) and the order for the renewable and/or service is made from the third party system 400 to the host entity system 1002 over network 150 upon receipt of the token.

In addition to the communications from the resource management device 800 to a financial institution, the system may allow communication to the resource management device 800 such that the user, custodian, and/or third party system may direct the resource management options. For example, the custodian may set limits on the frequency with which a financial institution may cause targeted communications be initiated between a host entity and the custodian. Such limits may be based on the type of smart device, the perceived severity of the service or replacement need, plans established by the custodian and shared with the financial institution, and other factors. The user and/or custodian may directly communicate with the resource management device 800 over network 150 using computing device 120 or the user instructions may be communicated to the third party system 400 from the user such as by computing device 120 over network 150 and the third party institution system 400 may communicate with the smart device over network 150. In some embodiments the limits or controls put on the resource management device 800 may originate with the third party system 400 such that the resource management may be controlled at least in part by the third party system.

Figure 7:
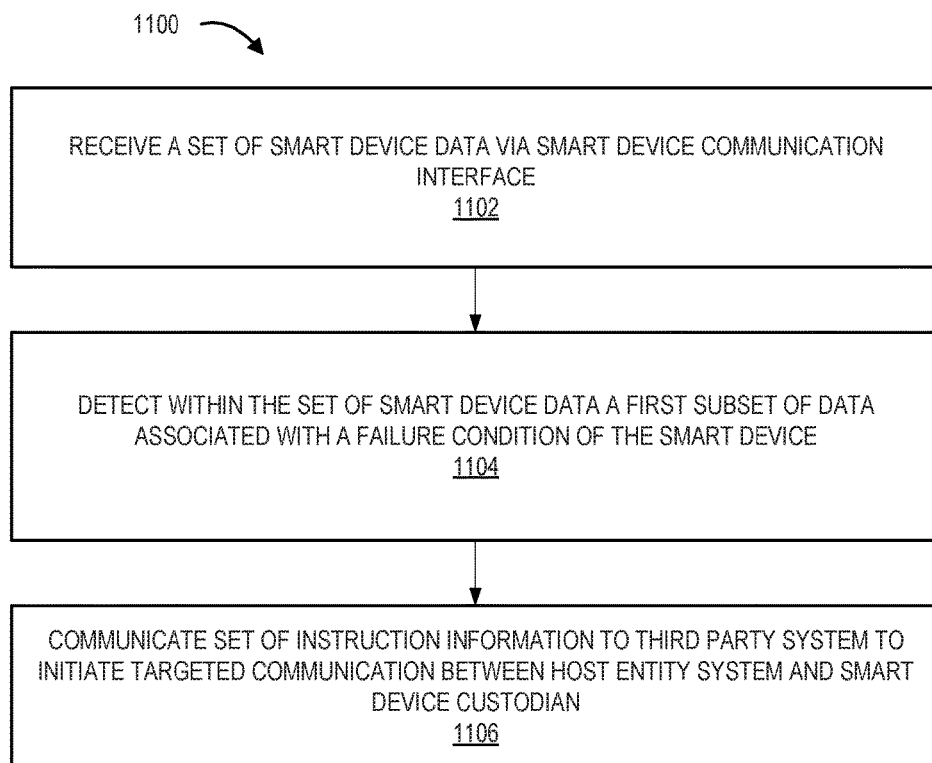
FIG. 7 is a flowchart illustrating methods for security implementation for user resource distribution and management in accordance with embodiments of the invention.

FIG. 7 depicts a process 1100 for security implementation for user resource distribution and management in accordance with embodiments of the invention. As shown in FIG. 7, process 1100 commences at block 1102 with receiving from a smart device associated with a first custodian a set of smart device data via the smart device communication interface. In some example embodiments of block 1102, a resource management device, such as resource management devices 800a, 800b, or 800c, as described herein, or other such resource management devices receives the set of smart device data via a smart device communication interface, such as the example smart device communication interface 830 described in connection with FIG. 6. Likewise, the smart device contemplated in example implementations of block 1102 may be any of the smart devices described herein or any devices similar thereto, including but not limited to the subscription smart device 600a, metered smart device 600b, or smart device with renewables 600c described previously herein. In some example implementations of block 1102, the set of smart device data comprises an identification of the smart device (such as a make and/or model number, a unique identifier, and/or other information associated with the identity of the smart device), a usage profile associated with the smart device, and, in some example implementations, a diagnostic code generated by the smart device. A usage profile may include any information associated with the use of the smart device. For example, the usage profile may include the age of the smart device, the number of cycles the smart device has performed, data pertaining the power consumption of the smart device, a service history, and any other metrics or data generated in the course of the use of the smart device. In example implementations that involve a diagnostic code, the diagnostic code may be generated by the smart device as part of the normal operation of the smart device, upon the triggering of an error condition, upon the receipt of a request to run a diagnostic protocol, or the like.

As shown in FIG. 7, process 1100 continues at block 1104, which includes detecting within the set of smart device data a first subset of data associated with a failure condition of the smart device. In some example implementations, the detection of a first subset of data comprises comparing the usage profile associated with the smart device to a predetermined standard usage profile. In some such example implementations, and in other example implementations, detecting a first subset of data associated with a failure condition of the smart device comprises comparing the diagnostic code against a predetermined set of diagnostic codes associated with the smart device. With reference to FIGS. 1 and 6, resource management application 856 may be include a standard usage profile associated with the smart device and/or set of diagnostic codes associated with the smart device. Alternatively, resource management device 800 may communicate with the third party entity system 400 and/or a relevant host entity or host entity system via network communication interface 810 over network 150 to acquire such standard usage profiles and/or diagnostic codes. In some example embodiments, a financial institution and/or a host entity may have developed a standard usage profile that may reflect, for example, the typical usage of a particular type or class of smart device, information associated with a probability of need of repair and/or replacement, and/or other information that is associated with operation and eventual failure of the smart device. Likewise, the diagnostic codes associated with the smart device may reflect self-diagnostic functionality designed and manufactured into the smart device from its inception, and be used to ascertain status of the smart device at a particular point in time.

Process 1100 continues with block 1106, which includes communicating a set of instruction information to a third party system via a network communication interface, wherein the instruction information is usable by the third party system to initiate a targeted communication between a host entity system associated with the smart device and the custodian. With reference to FIGS. 1 and 6, a resource management device, such as resource management device 800, may communicate with a third party system such as the third party entity system 400 over network 150 via network communication interface 810. In some example implementations, the set of instruction information comprises the set of smart device data, an identification of the failure condition of the smart device, and set of contact information associated with the custodian. With such instruction information, the third party system (such as third party entity system 400, may transmit a message to a host entity system requesting that an appropriate host entity contact the custodian regarding the failure condition of the smart device.

As shown in process 1100, some example implementations of the embodiments described herein contemplate the use of a resource management device to acquire information from a smart device and detect when a failure condition has occurred and/or when the smart device is in a state that is leading to a potentially significant failure condition. Upon recognizing such failure condition (or failure condition to occur in the future), the resource management device can transmit instructions to a third party system, such as a financial institution, to coordinate maintenance, repair, and/or replacement of the smart device. As such, data received and detected by a resource management device is processed and used to send a signal, such as a message to the third party system, that triggers a physical change, such as a communication between a host entity (such as a repair person) and the custodian of the smart device, that will typically result in a physical change to the smart device itself, in the form of repair, replenishment of renewables and/or other adjustment of the physical smart device.

Figure 8:
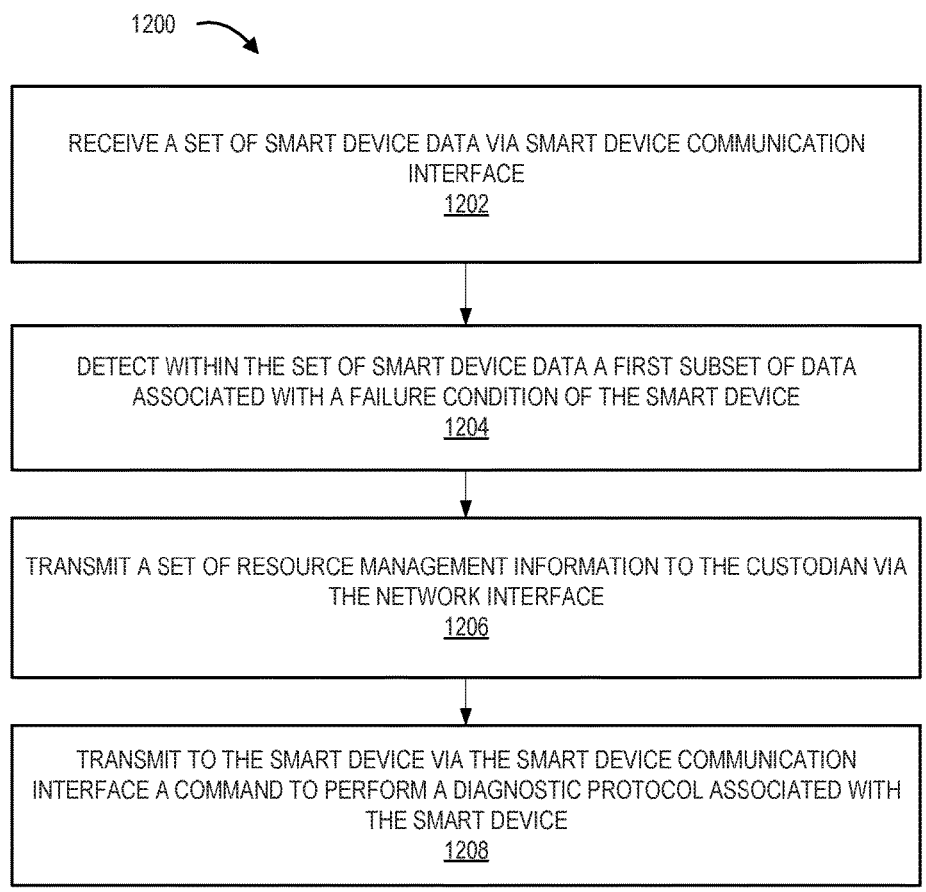
FIG. 8 is a flowchart illustrating a method for establishing security implementation for user resource distribution and management in accordance with embodiments of the invention.

FIG. 8 is a flowchart illustrating a method 1200 for establishing security implementation for user resource distribution and management in accordance with embodiments of the invention. As shown in FIG. 8, method 1200 includes blocks 1202 and 1204, which are identical to blocks 1102 and 1104 as described with respect to FIG. 7. All potential implementations of blocks 1102 and 1104 may be used in example implementations of blocks 1202 and 1204.

As shown at block 1206, method 1200 includes, in response to detecting the first subset of data associated with a failure condition of the smart device, transmitting to the custodian a set of resource management information via the network communication interface. With reference to FIGS. 1 and 6, upon detecting a failure condition and/or potential failure condition, the resource management device (such as resource management device 800) communicates with the custodian of a smart device via network 150 and network communication interface 810. In some example implementations, the communication to the custodian will include information about the failure condition, and contact information associated with a host entity system. For example, in the context of a failing HVAC system, the resource management device may detect a usage pattern that suggests that the air conditioning is likely to fail if subjected to heavy demand in the near future, and transmit such notice to the custodian, along with contact information for one or more HVAC repair businesses local to the custodian. In some other example implementations, particularly when there is a third party system associated with a financial institution in communication with the resource management device, the information sent to the custodian may include loan offers, product offerings, data about beneficial times to purchaser services or replacement devices, information about trends in the market, and other information that may allow the custodian to make an informed decision about whether, when, and how to address the present and/or future failure condition of one or more smart devices.

As depicted in block 1208, method 1200 also includes transmitting to the smart device via the smart device communication interface a command to perform a diagnostic protocol associated with the smart device. In some example implementations, the usage profile of device may be correlated with a potential failure of the device. However, and particularly where the data and research underlying the correlation is relatively new or insufficiently strong in its ability to predict failures, it may be beneficial to trigger a diagnostic protocol to be run on the smart device. Consequently, example implementations of method 1200 involve the receipt by a resource management device of data generated by the smart device, the processing of the received data by the resource management device, and the transmission of a signal that effects a physical change in the operation and/or configuration of the smart device, by causing the smart device to cease and/or suspend normal operation and perform a diagnostic protocol.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium. Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s)

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s).

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

What is claimed is:

1. A resource management system comprising:

a network communication interface;

a smart device communication interface;

a memory device storing a resource management application;

a processing device operatively coupled to the memory device, wherein the processing device is configured to execute computer-readable program code to:

receive from a smart device a set of smart device data via the smart device communication interface, wherein the set of smart device data comprises an identification of the smart device, a usage profile associated with the smart device, and a diagnostic code generated by the smart device;

receive from a third party system or a host entity system a predetermined standard usage profile;

compare the usage profile associated with the smart device to the predetermined standard usage profile;

based on comparing the usage profile associated with the smart device to the predetermined standard usage profile, detect within the set of smart device data a first subset of data associated with a failure condition of the smart device; and in response to detecting the first subset of data associated with the failure condition of the smart device, determine that the smart device is in need of maintenance, repair, or replacement and communicate a set of instruction information to the third party system via the network communication interface.

| Docket Number | U.S. Patent Application Ser. No. | Title | Filed On |
| --- | --- | --- | --- |
| 7085US1.014033.2722 | 15/082,476 | ENHANCING AUTHENTICATION AND SOURCE OF PROOF THROUGH A DYNAMICALLY UPDATABLE BIOMETRICS DATABASE | Mar. 28, 2016 |
| 7086US1.014033.2723 | 15/082,229 (now issued as U.S. Pat. No. 9,507,984) | RESOURCE TAG GENERATION AND DEPLOYMENT FOR RESOURCE VALUATION AND DISTRIBUTION | Mar. 28, 2016 |
| 7089US1.014033.2724 | 15/082,233 | SYSTEM FOR REAL-TIME RELEASE OF ALLOCATED RESOURCES BASED ON DEVICE STAGE | Mar. 28, 2016 |
| 7097US1.014033.2726 | 15/082,952 | SECURITY IMPLEMENTATION FOR USER RESOURCE DISTRIBUTION WITH PERIPHERAL DEVICE | Mar. 28, 2016 |
| 7098US1.014033.2727 | 15/082,659 | INTELLIGENT RESOURCE PROCUREMENT SYSTEM BASED ON PHYSICAL PROXIMITY TO RELATED RESOURCES | Mar. 28, 2016 |
| 7082US1.014033.2728 | 15/082,603 | SYSTEM FOR MACHINE-INITIATED RESOURCE GENERATION AND CUSTOMIZATION | Mar. 28, 2016 |
| 7083US1.014033.2729 | 15/082,964 | SECURITY IMPLEMENTATION FOR USER RESOURCE DISTRIBUTION | Mar. 28, 2016 |
| 7084US1.014033.2730 | 15/082,645 | SYSTEM FOR ADAPTATION OF MULTIPLE DIGITAL SIGNATURES IN A DISTRIBUTED NETWORK | Mar. 28, 2016 |

2. The system of claim 1, wherein:
the smart device is associated with a custodian; and
the instruction information is usable by the third party system to initiate a targeted communication between the host entity system associated with the smart device and the custodian.

3. The system of claim 2, wherein the targeted communication is related to maintenance, repair, or replacement of the smart device.

4. The system of claim 1, wherein the third party system is a financial institution system.

5. The system of claim 1, wherein detecting within the set of smart device data a first subset of data associated with a failure condition of the smart device comprises comparing the diagnostic code against a predetermined set of diagnostic codes associated with the smart device.

6. The system of claim 1, wherein:
the smart device is associated with a custodian; and
the set of instruction information comprises the set of smart device data, an identification of the failure condition, and a set of contact information associated with the custodian.

7. The system of claim 1, wherein the host entity system is associated with an entity associated with the smart device and the failure condition associated with the smart device.

8. The system of claim 1, wherein the usage profile comprises an age of the smart device, a number of cycles the smart device has performed, data pertaining to power consumption of the smart device, or a service history.

9. The system of claim 1, wherein the set of instruction information comprises instructions to coordinate maintenance, repair, and/or replacement of the smart device.

10. The system of claim 1, wherein the smart device is an appliance, home entertainment device, building system, or a wearable device.

11. The system of claim 1, wherein the smart device is a refrigerator, stove, oven, washer, dryer, or dish washer.

12. The system of claim 1, wherein the smart device is a set top box, gaming system, or television.

13. The system of claim 1, wherein the smart device is a home security system, electrical system, water system, plumbing system, electric meter, water meter, hot water heater, or gas meter.

14. The system of claim 1, wherein the smart device is a wearable device.

15. A computerized method for managing resources, the method comprising:
receiving from a smart device a set of smart device data via a smart device communication interface, wherein the set of smart device data comprises an identification of the smart device, a usage profile associated with the smart device, and a diagnostic code generated by the smart device;
receiving from a third party system or a host entity system a predetermined standard usage profile;
comparing the usage profile associated with the smart device to the predetermined standard usage profile;
based on comparing the usage profile associated with the smart device to the predetermined standard usage profile, detecting within the set of smart device data a first subset of data associated with a failure condition of the smart device; and
in response to detecting the first subset of data associated with the failure condition of the smart device, determining that the smart device is in need of maintenance, repair, or replacement and communicating a set of instruction information to the third party system.

16. The method of claim 15, wherein:
the smart device is associated with a custodian; and
the instruction information is usable by the third party system to initiate a targeted communication between the host entity system associated with the smart device and the custodian.

17. The method of claim 16, wherein the targeted communication is related to maintenance, repair, or replacement of the smart device.

18. The method of claim 15, wherein the third party system is a financial institution system.

19. The method of claim 15, wherein detecting within the set of smart device data a first subset of data associated with a failure condition of the smart device comprises comparing the diagnostic code against a predetermined set of diagnostic codes associated with the smart device.

20. A resource management device comprising:
a network communication interface;
a smart device communication interface;
a memory device storing a resource management application;
a processing device operatively coupled to the memory device, wherein the processing device is configured to execute computer-readable program code to:
receive from a smart device associated with a custodian a set of smart device data via the smart device communication interface, wherein the set of smart device data comprises an identification of the smart device, a usage profile associated with the smart device, and a diagnostic code generated by the smart device;
receive from a third party system or a host entity system a predetermined standard usage profile;
compare the usage profile associated with the smart device to the predetermined standard usage profile;
based on comparing the usage profile associated with the smart device to the predetermined standard usage profile, detect within the set of smart device data a first subset of data associated with a failure condition of the smart device; and
in response to detecting the first subset of data associated with the failure condition of the smart device, determine that the smart device is in need of maintenance, repair, or replacement and transmit to the custodian a set of resource management information via the network communication interface.

* * * * *